United States Patent
Nallen et al.

(10) Patent No.: US 12,472,172 B2
(45) Date of Patent: Nov. 18, 2025

(54) LOMITAPIDE FOR USE IN METHODS OF TREATING HYPERLIPIDEMIA AND HYPERCHOLESTEROLEMIA IN PEDIATRIC PATIENTS

(71) Applicant: Amryt Pharmaceuticals Inc., Boston, MA (US)

(72) Inventors: Ruth Nallen, Dublin (IE); Tracy Cunningham, Dublin (IE); Mark Sumeray, Zug (CH)

(73) Assignee: AMRYT PHARMACEUTICALS INC., Boston, MA (US)

( * ) Notice: Subject to any disclaimer, the term of this patent is extended or adjusted under 35 U.S.C. 154(b) by 0 days.

(21) Appl. No.: 18/489,542

(22) Filed: Oct. 18, 2023

(65) Prior Publication Data

US 2024/0058317 A1    Feb. 22, 2024

Related U.S. Application Data

(63) Continuation of application No. 18/018,031, filed as application No. PCT/US2021/043667 on Jul. 29, 2021, now abandoned.

(60) Provisional application No. 63/058,211, filed on Jul. 29, 2020.

(51) Int. Cl.
*A61K 31/4468* (2006.01)
*A61P 3/06* (2006.01)

(52) U.S. Cl.
CPC ............ *A61K 31/4468* (2013.01); *A61P 3/06* (2018.01)

(58) Field of Classification Search
CPC ............................... A61K 31/4468; A61P 3/06
See application file for complete search history.

(56) References Cited

U.S. PATENT DOCUMENTS

| | | |
|---|---|---|
| 3,983,140 A | 9/1976 | Endo et al. |
| 4,231,938 A | 11/1980 | Monaghan et al. |
| 4,346,227 A | 8/1982 | Terahara et al. |
| 4,448,784 A | 5/1984 | Glamkowski et al. |
| 4,450,171 A | 5/1984 | Hoffman et al. |
| 4,499,289 A | 2/1985 | Baran et al. |
| 4,613,610 A | 9/1986 | Wareing |
| 4,647,576 A | 3/1987 | Hoefle et al. |
| 4,686,237 A | 8/1987 | Anderson |
| 4,716,175 A | 12/1987 | Hoefle et al. |
| 4,871,721 A | 10/1989 | Biller |
| 4,924,024 A | 5/1990 | Biller |
| 5,015,644 A | 5/1991 | Roth et al. |
| 5,026,554 A | 6/1991 | Bartizal et al. |
| 5,117,080 A | 5/1992 | Lee |
| 5,510,379 A | 4/1996 | Lee et al. |
| 5,595,872 A | 1/1997 | Wetterau, II et al. |
| 5,684,014 A | 11/1997 | Muller et al. |
| 5,712,279 A | 1/1998 | Biller et al. |
| 5,712,396 A | 1/1998 | Magnin et al. |
| 5,739,135 A | 4/1998 | Biller et al. |
| 5,760,246 A | 6/1998 | Biller et al. |
| 5,767,115 A | 6/1998 | Rosenblum et al. |
| 5,786,361 A | 7/1998 | Muller et al. |
| 5,789,197 A | 8/1998 | Wetterau, II et al. |
| 5,811,429 A | 9/1998 | Connell et al. |
| 5,827,875 A | 10/1998 | Dickson, Jr. et al. |
| 5,883,099 A | 3/1999 | Biller et al. |
| 5,883,109 A | 3/1999 | Gregg et al. |
| 5,885,983 A | 3/1999 | Biller et al. |
| 5,952,498 A | 9/1999 | Lenfers et al. |
| 5,990,110 A | 11/1999 | Firestone |
| 6,034,115 A | 3/2000 | Connell et al. |
| 6,057,339 A | 5/2000 | Gregg |
| 6,066,650 A | 5/2000 | Biller et al. |
| 6,066,653 A | 5/2000 | Gregg et al. |
| 6,114,341 A | 9/2000 | Muller et al. |
| 6,121,283 A | 9/2000 | Chang et al. |
| 6,140,343 A | 10/2000 | DeNinno et al. |
| 6,194,454 B1 | 2/2001 | Dow |
| 6,245,775 B1 | 6/2001 | Muller et al. |
| 6,265,431 B1 | 7/2001 | Muller et al. |
| 6,297,233 B1 | 10/2001 | Stein et al. |
| 6,344,450 B1 | 2/2002 | Bisacchi et al. |
| 6,479,503 B2 | 11/2002 | Muller et al. |
| 6,492,365 B1 | 12/2002 | Wetterau, II et al. |
| 6,498,156 B2 | 12/2002 | Glombik et al. |
| 6,582,698 B1 | 6/2003 | Dedrick et al. |
| 6,620,821 B2 | 9/2003 | Robl |
| 6,627,636 B2 | 9/2003 | Robl |
| 6,720,351 B2 | 4/2004 | Bertinato et al. |
| 6,774,236 B1 | 8/2004 | Lenfers et al. |

(Continued)

FOREIGN PATENT DOCUMENTS

| | | |
|---|---|---|
| AU | 6239798 A | 8/1998 |
| AU | 727895 B2 | 1/2001 |

(Continued)

OTHER PUBLICATIONS

Ben-Omran et al., "Real-World Outcomes with Lomitapide Use in Paediatric Patients with Homozygous Familial Hypercholesterolaemia," Adv. Ther. 36(7):1786-811. PMID: 31102204. (Year: 2019).*
Neef et al., "Lomitapide for use in patients with homozygous familial hypercholesterolemia: a narrative review," Exp. Rev. Clin. Pharmacol. 9(5), 655-63. PMID: 31102204 (Year: 2016).*
Ben-Omran et al., "Real-World Outcomes with Lomitapide Use in Paediatric Patients with Homozygous Familial Hypercholesterolaemia," Adv. Ther. 36(7):1786-11 (Year: 2019).*
Abell et al., "A simplified method for the estimation of total cholesterol in serum and demonstration of its specificity", J Bio Chem. 1952; 195: 357-362.
Adroca '135 IPR, Exhibit 1001—Certified U.S. Pat. No. 8,618,135 to Rader, issued Dec. 31, 2013, (15 pages).
Adroca '135 IPR, Exhibit 1002—Declaration of Randall M. Zusman, M.D., dated Aug. 5, 2015, (150 pages).

(Continued)

*Primary Examiner* — Theodore R. Howell
(74) *Attorney, Agent, or Firm* — COOLEY LLP

(57) ABSTRACT

Provided herein are methods of treating hyperlipidemia or hypercholesterolemia in pediatric patients with lomitapide or a pharmaceutically acceptable salt thereof.

24 Claims, 2 Drawing Sheets

(56) References Cited

U.S. PATENT DOCUMENTS

| | | |
|---|---|---|
| 6,774,238 B2 | 8/2004 | Pastor et al. |
| 6,812,345 B2 | 11/2004 | Robl et al. |
| 6,846,836 B2 | 1/2005 | Hamann et al. |
| 6,858,622 B2 | 2/2005 | Muller et al. |
| 6,875,782 B2 | 4/2005 | Cheng et al. |
| 6,884,812 B2 | 4/2005 | Glombik et al. |
| 6,916,809 B2 | 7/2005 | Chen et al. |
| 6,916,813 B2 | 7/2005 | Atwal et al. |
| 6,949,572 B2 | 9/2005 | Bertinato et al. |
| 6,979,692 B2 | 12/2005 | Bertinato et al. |
| 7,053,080 B2 | 5/2006 | Davis et al. |
| 7,056,906 B2 | 6/2006 | Strony |
| 7,358,254 B2 | 4/2008 | Robl et al. |
| 7,394,501 B2 | 7/2008 | Iwata |
| 7,598,412 B2 | 10/2009 | Hadida et al. |
| 7,645,732 B2 | 1/2010 | Ye et al. |
| 7,932,268 B2 | 4/2011 | Rader |
| 8,618,135 B2 | 12/2013 | Rader |
| 9,265,758 B2 | 2/2016 | Rader |
| 9,364,470 B2 | 6/2016 | Rader |
| 9,433,617 B1 | 9/2016 | Rader |
| 9,861,622 B2 | 1/2018 | Rader |
| 10,016,404 B2 | 7/2018 | Rader |
| 10,213,419 B2 | 2/2019 | Gelormini |
| 10,555,938 B2 | 2/2020 | Rader |
| 11,554,113 B2 | 1/2023 | Rader |
| 2002/0035064 A1 | 3/2002 | Robl et al. |
| 2002/0045271 A1 | 4/2002 | Hussain et al. |
| 2003/0069221 A1 | 4/2003 | Kosoglou et al. |
| 2003/0109543 A1 | 6/2003 | Ogletree |
| 2003/0153541 A1 | 8/2003 | Dudley et al. |
| 2003/0162788 A1 | 8/2003 | Thomas et al. |
| 2003/0187053 A1 | 10/2003 | Bertinato et al. |
| 2004/0014748 A1 | 1/2004 | Grutzmann et al. |
| 2004/0058908 A1 | 3/2004 | Keller et al. |
| 2005/0075367 A1 | 4/2005 | Hagiwara et al. |
| 2005/0075387 A1 | 4/2005 | Tickner et al. |
| 2005/0090426 A1 | 4/2005 | Blumberg |
| 2005/0101561 A1 | 5/2005 | Tunac |
| 2006/0069161 A1 | 3/2006 | Lee et al. |
| 2006/0135460 A1 | 6/2006 | Widder et al. |
| 2006/0153913 A1 | 7/2006 | Yamane et al. |
| 2006/0160834 A1 | 7/2006 | Fong et al. |
| 2006/0166999 A1 | 7/2006 | Grutzmann et al. |
| 2006/0205726 A1 | 9/2006 | Hagiwara et al. |
| 2006/0211020 A1 | 9/2006 | Farrer et al. |
| 2006/0211762 A1 | 9/2006 | Rongen et al. |
| 2006/0252733 A1 | 11/2006 | Jansen |
| 2006/0270655 A1 | 11/2006 | Swick et al. |
| 2007/0027093 A1 | 2/2007 | Ogawa et al. |
| 2007/0032404 A1 | 2/2007 | Sweet |
| 2007/0088089 A1 | 4/2007 | Wisler |
| 2007/0093468 A1 | 4/2007 | Wisler |
| 2007/0093527 A1 | 4/2007 | Wisler |
| 2007/0098778 A1 | 5/2007 | Borsadia |
| 2007/0099884 A1 | 5/2007 | Erondu et al. |
| 2008/0016127 A1 | 1/2008 | Field |
| 2008/0033019 A1 | 2/2008 | Stamler |
| 2008/0051427 A1 | 2/2008 | Schuckler |
| 2008/0103122 A1 | 5/2008 | Veltri |
| 2008/0161279 A1 | 7/2008 | Wisler |
| 2008/0175864 A1 | 7/2008 | Ye et al. |
| 2008/0241869 A1 | 10/2008 | Davis |
| 2008/0248070 A1 | 10/2008 | Tunac |
| 2008/0253985 A1 | 10/2008 | Wisler |
| 2008/0255084 A1 | 10/2008 | Webb |
| 2008/0280992 A1 | 11/2008 | Kunz et al. |
| 2009/0042835 A1 | 2/2009 | Davis |
| 2009/0042941 A1* | 2/2009 | Rader .............. A61K 9/0053 514/325 |
| 2009/0054393 A1 | 2/2009 | Wisler |
| 2009/0093527 A1 | 4/2009 | Li et al. |
| 2010/0273829 A1 | 10/2010 | Wisler |
| 2012/0035204 A1 | 2/2012 | Sasiela |
| 2015/0139987 A1 | 5/2015 | Martin et al. |
| 2017/0246133 A1 | 8/2017 | Bisgaier |
| 2018/0250251 A1 | 9/2018 | Bisgaier |
| 2021/0205287 A1 | 7/2021 | Rader |
| 2023/0109871 A1 | 4/2023 | Rader |
| 2023/0285376 A1 | 9/2023 | Nallen et al. |
| 2023/0381166 A1 | 11/2023 | Rader |
| 2024/0165093 A1 | 5/2024 | Sumeray |

FOREIGN PATENT DOCUMENTS

| | | |
|---|---|---|
| CA | 2091102 A1 | 9/1993 |
| CA | 2291471 A1 | 6/2000 |
| CA | 2325201 A1 | 5/2001 |
| CN | 107773561 A | 3/2018 |
| CN | 109069641 A | 12/2018 |
| DE | 19951022 A1 | 4/2001 |
| EP | 0142146 A2 | 5/1985 |
| EP | 0221025 A1 | 5/1987 |
| EP | 0325130 A2 | 7/1989 |
| EP | 0705831 A2 | 4/1996 |
| EP | 0779276 A1 | 6/1997 |
| EP | 0779279 A1 | 6/1997 |
| EP | 0799828 A2 | 10/1997 |
| EP | 0802198 A2 | 10/1997 |
| EP | 1099442 A2 | 5/2001 |
| EP | 1181954 A2 | 2/2002 |
| EP | 2205837 B1 | 9/2011 |
| EP | 2596393 A1 | 5/2013 |
| FR | 2596393 A1 | 10/1987 |
| GB | 2205837 A | 12/1988 |
| JP | 2002220345 A | 8/2002 |
| JP | 2003321424 A | 11/2003 |
| WO | WO-8603488 A1 | 6/1986 |
| WO | WO-8607054 A1 | 12/1986 |
| WO | WO-9626205 A1 | 8/1996 |
| WO | WO-9626946 A1 | 9/1996 |
| WO | WO-9626948 A1 | 9/1996 |
| WO | WO-9640640 A1 | 12/1996 |
| WO | WO-9726240 A1 | 7/1997 |
| WO | WO-9741111 A1 | 11/1997 |
| WO | WO-9803069 A1 | 1/1998 |
| WO | WO-9803174 A1 | 1/1998 |
| WO | WO-9823593 A1 | 6/1998 |
| WO | WO-9827979 A1 | 7/1998 |
| WO | WO-9831225 A1 | 7/1998 |
| WO | WO-9831366 A1 | 7/1998 |
| WO | WO-9831367 A1 | 7/1998 |
| WO | WO-9850028 A1 | 11/1998 |
| WO | WO-0038725 A1 | 7/2000 |
| WO | WO-0108679 A1 | 2/2001 |
| WO | WO-2004008861 A1 | 1/2004 |
| WO | WO-2004028544 A1 | 4/2004 |
| WO | WO-2004110368 A2 | 12/2004 |
| WO | WO-2004110375 A2 | 12/2004 |
| WO | WO-2005000217 A2 | 1/2005 |
| WO | WO-2005033100 A1 | 4/2005 |
| WO | WO-2005051382 A1 | 6/2005 |
| WO | WO-2005072740 A2 | 8/2005 |
| WO | WO-2005084666 A1 | 9/2005 |
| WO | WO-2005085466 A2 | 9/2005 |
| WO | WO-2005087234 A1 | 9/2005 |
| WO | WO-2005087324 A1 | 9/2005 |
| WO | WO-2005094864 A2 | 10/2005 |
| WO | WO-2005097131 A2 | 10/2005 |
| WO | WO-2006046623 A1 | 5/2006 |
| WO | WO-2006062748 A2 | 6/2006 |
| WO | WO-2006063128 A2 | 6/2006 |
| WO | WO-2006108666 A1 | 10/2006 |
| WO | WO-2006111238 A1 | 10/2006 |
| WO | WO-2007047724 A2 | 4/2007 |
| WO | WO-2007047880 A2 | 4/2007 |
| WO | WO-2008012056 A1 | 1/2008 |
| WO | WO-2008021353 A2 | 2/2008 |
| WO | WO-2008030382 A1 | 3/2008 |
| WO | WO-2008072061 A1 | 6/2008 |
| WO | WO-2008075949 A1 | 6/2008 |
| WO | WO-2008079398 A1 | 7/2008 |
| WO | WO-2008090198 A1 | 7/2008 |
| WO | WO-2008115574 A1 | 9/2008 |

(56) References Cited

FOREIGN PATENT DOCUMENTS

| WO | WO-2017189813 A1 | 11/2017 |
|---|---|---|
| WO | WO-2022026684 A1 | 2/2022 |
| WO | WO-2022187463 A1 | 9/2022 |

OTHER PUBLICATIONS

Adroca '135 IPR, Exhibit 1003—Declaration of Michael Meyersohn, Ph.D., dated Aug. 7, 2015, (57 pages).

Adroca '135 IPR, Exhibit 1004—Affidavit of Christopher Butler, Office Manager, Internet Archive, authenticating Internet Archive URLs (Jun. 16, 2015) (attaching as Ex. A: PPD News & IR Presentations (Apr. 15, 2004) (available at https://web.archive.org/web/20040415065142/ http://ppdi.com/PPD_6_12.htm)). (5 pages).

Adroca '135 IPR, Exhibit 1005—Affidavit of Christopher Butler, Office Manager, Internet Archive, authenticating Internet Archive URLs (Jun. 12, 2015) (attaching as Ex. A: PPD News Releases (Feb. 13, 2004) (available at https://web.archive.org/web/20040213233245/http://www.ppdi.com/PPD_U6.-htm?ID=126662); PPD News & IR Presentations (Dec. 12, 2003) (available at https://web.archive.org/web/20031212193444/ http://ppdi.com/PPD_6_12.htm); PPD News & IR Presentations (Jun. 4, 2004) (available at https://web.archive.org/web/20040604203252/ http://www.ppdi.com/PPD_6_12.htm)). (8 pages).

Adroca '135 IPR, Exhibit 1006—Certified U.S. Appl. No. 60/550,915, filed Mar. 5, 2004, (34 pages).

Adroca '135 IPR, Exhibit 1007—U.S. Pat. No. 8,618, 135 issued Dec. 31, 2013, (highlighting dosing information not present in U.S. Appl. No. 60/550,915). (14 pages).

Adroca '135 IPR, Exhibit 1008—U.S. Appl. No. 13/046,118, filed Mar. 11, 2011, (35 pages).

Adroca '135 IPR, Exhibit 1009—In re Application of: Rader, U.S. Appl. No. 13/046,118, Amendment and Response to Oct. 2, 2012 Office Action (dated Mar. 4, 2013). (9 pages).

Adroca '135 IPR, Exhibit 1010—In re Application of: Rader, U.S. Appl. No. 13/046,118, Declaration of William Sasiela, Ph.D. (filed Apr. 8, 2010). (11 pages).

Adroca '135 IPR, Exhibit 1011—In re Application of: Rader, U.S. Appl. No. 13/046,118, Notice of Allowance (dated May 10, 2013). (5 pages).

Adroca '135 IPR, Exhibit 1012—In re Application of: Rader, U.S. Appl. No. 13/046,118, Notice of Allowance (dated Sep. 3, 2013). (5 pages).

Adroca '135 IPR, Exhibit 1013—Bayer/PPD Implitapide Development Follows Zetia Model as Statin Add-On, 66 The Pink Sheet 17 (Feb. 16, 2004). (2 pages).

Adroca '135 IPR, Exhibit 1014—Evan Stein, CEO & President, MRL Int'l (Division of PPD), Presentation Given at PPDs Analyst Day, Microsomal Triglygeride [sic] Transfer Protein (MTP) Inhibitor (implitapide) program (Feb. 5, 2004). (45 pages).

Adroca '135 IPR, Exhibit 1015—George Chang et al., Microsomal triglyceride transfer protein (MTP) inhibitors: Discovery of clinically active inhibitors using high-throughput screening and parallel synthesis paradigms, 5 Current Opinion in Drug Discovery & Dev. 562 (2002). (9 pages).

Adroca '135 IPR, Exhibit 1016—Charles E. Chandler et al., CP-346086: an MTP Inhibitor that lowers plasma cholesterol and triglycerides in experimental animals and in humans, 44 J. of Lipid Res. 1887 (2003). (15 pages).

Adroca '135 IPR, Exhibit 1017—FDA approves Zetia—first new class to treat cholesterol since statins introduced, drugs.com (Oct. 28, 2002), http://www.drugs.com/news/fda-approves-zetia-first-new-class-cholesterol-- since-statins-introduced-3164.html (last visited Jul. 22, 2015). (2 pages).

Adroca '135 IPR, Exhibit 1018—John R. Wetterau et al., An MTP Inhibitor That Normalizes Atherogenic Lipoprotein Levels in WHHL Rabbits, 282 Sci. 751 (1998). (5 pages).

Adroca '135 IPR, Exhibit 1019—U.S. Pat. No. 5,712,279 to Biller et al., issued Jan. 27, 1998, (98 pages).

Adroca '135 IPR, Exhibit 1020—Evan Stein, Opposition Against European Patent No. 1 725 234 B9 (filed Aug. 21, 2013). (12 pages).

Adroca '135 IPR, Exhibit 1021—Thompson PDR, Physicians' Desk Reference 506-09, 1101-06, 1813-21, 2036-41, 2126-31, 2547-51, 2729-31, 2865-68 (57th ed. 2003) (excerpting product information for Tricor.RTM., Pravachol.RTM., Advicor.RTM., Niaspan. RTM., Mevacor.RTM., Zocor.RTM., Lipitor.RTM., Colestid.RTM., and Lescol.RTM.). (44 pages).

Adroca '135 IPR, Exhibit 1022—Thompson PDR, Physicians' Desk Reference 2118-23, 3085-89 (58th ed. 2004) (excerpting product Information for Zetia.RTM). (12 pages).

Adroca '135 IPR, Exhibit 1023—U.S. Food & Drug Ass'n, Estimating the Maximum Safe Starting Dose in Initial Clinical Trials for Therapeutics in Adult Healthy Volunteers: Guidance for Industry (2005). (30 pages).

Adroca '135 IPR, Exhibit 1024—Prices and coupons for 30 capsules of Juxtapid 5mg, 10mg, 20mg, 30mg, 40mg and 60mg (brand), goodrx.com, http://www.goodrx.com/juxtapid (last visited Jul. 16, 2015). (12 pages).

Adroca '135 IPR, Exhibit 1025—Dan Mangan, 'Fast Money' faux pas: Firm draws FDA warning, DOJ subpoena, cnbc.com (Jan. 13, 2014), http://www.cnbc.com/id/101327742 (last visited Jul. 22, 2015). (4 pages).

Adroca '135 IPR, Exhibit 1026—Malcolm Rowland & Thomas N. Tozer, Clinical Pharmacokinetics: Concepts and Applications 57 (3d ed. 1995). (4 pages).

Adroca '135 IPR, Exhibit 1027—Curriculum Vitae of Randall M. Zusman, M.D., dated Apr. 30, 2015, document filed Aug. 28, 2015, (31 pages).

Adroca '135 IPR, Exhibit 1028—Documents considered by Randall M. Zusman, M.D., document filed Aug. 28, 2015, (3 pages).

Adroca '135 IPR, Exhibit 1029 filed Aug. 28, 2015—Curriculum Vitae of Michael Mayersohn, Ph.D. (38 pages).

Adroca '135 IPR, Exhibit 1030 filed Aug. 28, 2015—Documents considered by Michael Mayersohn, Ph.D. (2 pages).

Adroca '135 IPR, Exhibit 1031—Third Report of the National Cholesterol Education Program (NCEP) Expert Panel on Detection, Evaluation and Treatment of High Blood Cholesterol in Adults (Adult Treatment Panel III) Final Report, 106 Circulation 3143 (2002). (280 pages).

Adroca '135 IPR, Exhibit 1032—Michael Mayersohn, Principles and Applications of Pharmacokinetics, in Medical Toxicology 282 (Richard C. Dart ed., 3d ed. 2004). (58 pages).

Adroca '135 IPR, Exhibit 1033—Masashi Shiomi & Takashi Ito, MTP inhibitor decreases plasma cholesterol levels in LDL receptor-deficient WHHL rabbits by lowering the VLDL secretion, 431 Eur. J. of Pharmacology 127 (2001). (5 pages).

Adroca '135 IPR, Exhibit 1034—Declaration of Jeffery A. Marx, Aug. 10, 2015, (31 pages).

Adroca '135 IPR, Exhibit 1035—Press Release, Cigna Corp., Cigna Announces Appearance at CIBC Healthcare Conference (Nov. 7, 2003), http://newsroom.cigna.com/articledisplay.cfm? articleid=236. (3 pages).

Adroca '135 IPR, Exhibit 1036—Press Release, Gilead Scis., Gilead Sciences to Present at the 7th Annual Lehman Brothers Global Healthcare Conference on Friday, Mar. 5; Webcast Available Through Gilead Corporate Website (Mar. 4, 2004), http://gilead.com/news/press-releases/2004/3/gilead-sciences-to-present-a- t-the-7th-annual-lehman-brothers-global-healthcare-conference-on-friday-ma- rch-5th-webcast-available-through-gilead-corporate-website?mode=print. (1 page).

Adroca '135 IPR, Exhibit 1037—Press Release, PR Newswire, Dot Hill to Present at Robert W. Baird 2004 Growth Stock Conference (May 4, 2004), http://www.prnewswire.com/news-releases/dot-hill-to-present-at-robert-w-b- aird-2004-growth-stock-conference-73777807.html. (2 pages).

Adroca '135 IPR, Exhibit 1038—Margaret A. McDowell et al., Anthropometric Reference Data for Children and Adults: U.S. Population, 1999-2002, CDC Advance Data From Vital & Health Stats. No. 361 (2005). (32 pages).

Adroca '135 IPR, Exhibit 1039—In re Application of: Rader, U.S. Appl. No. 13/046,118, Amendment dated Sep. 25, 2013, (6 pages).

(56) References Cited

OTHER PUBLICATIONS

Adroca '135 IPR, Exhibit 1040—In re Application of: Rader, U.S. Appl. No. 13/046,118, Supplemental Information Disclosure Statement, Sep. 25, 2013, (5 pages).
Adroca '135 IPR, Exhibit 1041—In re Application of: Rader, U.S. Appl. No. 13/046,118, Notice of Allowance (dated Oct. 29, 2013). (5 pages).
Adroca '268 IPR, Exhibit 1001—Certified U.S. Pat. No. 7,932,268 to Rader, issued Apr. 26, 2011, (15 pages).
Adroca '268 IPR, Exhibit 1002—Declaration of Randall M. Zusman, M.D., dated Aug. 25, 2015, (135 pages).
Adroca '268 IPR, Exhibit 1003—Declaration of Michael Mayersohn, Ph.D., dated Aug. 7, 2015, (57 pages).
Adroca '268 IPR, Exhibit 1004—Affidavit of Christopher Butler, Office Manager, Internet Archive, authenticating Internet Archive URLs (Jun. 16, 2015) (attaching as Ex. A: PPD News & IR Presentations (Apr. 15, 2004) (available at https://web.archive.org/web/20040415065142/ http://ppdi.com/PPD_6_12.htm)), (5 pages).
Adroca '268 IPR, Exhibit 1005—Affidavit of Christopher Butler, Office Manager, Internet Archive, authenticating Internet Archive URLs (Jun. 12, 2015) (attaching as Ex. A: PPD News Releases (Feb. 13, 2004) (available at https://web.archive.org/web/20040213233245/; http://www.ppdi.com/PPD_U6.htm-?ID=126662); PPD News & IR Presentations (Dec. 12, 2003) (available at https://web.archive.org/web/20031212193444/http://ppdi.com/PPD_6_12.htm); PPD News & IR Presentations (Jun. 4, 2004) (available at https://web.archive.org/web/20040604203252/http://www.ppdi.com/PPD_6_12.h-tm)). (8 pages).
Adroca '268 IPR, Exhibit 1006—Certified U.S. Appl. No. 60/550,915, filed Mar. 5, 2004, (34 pages).
Adroca '268 IPR, Exhibit 1007—U.S. Pat. No. 7,932,268, issued Apr. 26, 2011, (highlighting dosing information not present in U.S. Appl. No. 60/550,915). (14 pages).
Adroca '268 IPR, Exhibit 1008—U.S. Appl. No. 10/591,923, filed Sep. 5, 2006, (41 pages).
Adroca '268 IPR, Exhibit 1009—In re Application of: Rader, U.S. Appl. No. 10/591,923, Response to Oct. 21, 2009 Office Action (dated Apr. 14, 2010). (9 pages).
Adroca '268 IPR, Exhibit 1010—In re Application of: Rader, U.S. Appl. No. 10/591,923, Declaration of William Sasiela, Ph.D. (Apr. 8, 2010). (11 pages).
Adroca '268 IPR, Exhibit 1011—In re Application of: Rader, U.S. Appl. No. 10/591,923, Response to Jul. 26, 2010 Office Action (dated Sep. 13, 2010). (9 pages).
Adroca '268 IPR, Exhibit 1012—In re Application of: Rader, U.S. Appl. No. 10/591,923, Notice of Allowance (dated Jan. 25, 2011). (4 pages).
Adroca '268 IPR, Exhibit 1013—Bayer/PPD Implitapide Development Follows Zetia Model as Statin Add-On, 66 The Pink Sheet 17 (Feb. 16, 2004). (2 pages).
Adroca '268 IPR, Exhibit 1014—Evan Stein, CEO & President, MRL Int'l (Division of PPD), Presentation Given at PPD's Analyst Day, Microsomal Trigiygeride [sic] Transfer Protein (MTP) Inhibitor (implitapide) program (Feb. 5, 2004). (45 pages).
Adroca '268 IPR, Exhibit 1015—George Chang et al., Microsomal triglyceride transfer protein (MTP) inhibitors: Discovery of clinically active inhibitors using high-throughput screening and parallel synthesis paradigms, 5 Current Opinion in Drug Discovery & Dev. 562 (2002). (9 pages).
Adroca '268 IPR, Exhibit 1016—Charles E. Chandler et al., CP-346086: an MTP inhibitor that lowers plasma cholesterol and triglycerides in experimental animals and in humans, 44 J. of Lipid Res. 1887 (2003), (15 pages).
Adroca '268 IPR, Exhibit 1017—FDA approves Zetia—first new class to treat cholesterol since statins introduced, drugs.com (Oct. 28, 2002), http://www.drugs.com/news/fda-approves-zetia-first-new-class-cholesterol-- since-statins-introduced-3164.html (last visited Jul. 22, 2015). (2 pages).

Adroca '268 IPR, Exhibit 1018—John R. Wetterau et al., "An MTP Inhibitor That Normalizes Atherogenic Lipoprotein Levels in WHHL Rabbits", 282 Sci. 751 (1998). (5 pages).
Adroca '268 IPR, Exhibit 1019—U.S. Pat. No. 5,712,279 to Biller et al., issued Jan. 27, 1998, (98 pages).
Adroca '268 IPR, Exhibit 1020—Evan Stein, Opposition Against European Patent No. 1 725 234 B9 (filed Aug. 21, 2013). (12 pages).
Adroca '268 IPR, Exhibit 1021—Thompson PDR, Physicians' Desk Reference 506-09, 1101-06, 1813-21, 2036-41, 2126-31, 2547-51, 2729-31, 2865-68 (57th ed. 2003) (excerpting product information for Tricor.RTM., Pravachol.RTM., Advicor.RTM., Niaspan.RTM., Mevacor.RTM., Zocor.RTM., Lipitor.RTM., Colestid.RTM., Lescol.RTM.). (44 pages).
Adroca '268 IPR, Exhibit 1022—Thompson PDR, Physicians' Desk Reference 2118-23, 3085-89 (58th ed. 2004) (excerpting product Information for Zetia.RTM.). (12 pages).
Adroca '268 IPR, Exhibit 1023—U.S. Food & Drug Ass'n, Estimating the Maximum Safe Starting Dose in Initial Clinical Trials for Therapeutics in Adult Healthy Volunteers: Guidance for Industry (2005). (30 pages).
Adroca '268 IPR, Exhibit 1024—Prices and coupons for 30 capsules of Juxtapid 5mg, 10mg, 20mg, 30mg, 40mg and 60mg (brand), goodrx.com, http://www.goodrx.com/juxtapid (last visited Jul. 16, 2015). (12 pages).
Adroca '268 IPR, Exhibit 1025—Dan Mangan, 'Fast Money' faux pas: Firm draws FDA warning, DOJ subpoena, cnbc.com (Jan. 13, 2014), http://www.cnbc.com/id/101327742 (last visited Jul. 22, 2015). (4 pages).
Adroca '268 IPR, Exhibit 1026—Malcolm Rowland & Thomas N. Tozer, Clinical Pharmacokinetics: Concepts and Applications 57 (3d ed. 1995). (4 pages).
Adroca '268 IPR, Exhibit 1027—Curriculum Vitae of Randall M. Zusman, M.D., dated Apr. 30, 2015, (31 pages).
Adroca '268 IPR, Exhibit 1028—Documents considered by Randall M. Zusman, M.D., document filed Aug. 28, 2015, (3 pages).
Adroca '268 IPR, Exhibit 1029—Curriculum Vitae of Michael Mayersohn, Ph.D., filed Aug. 28, 2015, (38 pages).
Adroca '268 IPR, Exhibit 1030—Documents considered by Michael Mayersohn, Ph.D., filed Aug. 28, 2015, (2 pages).
Adroca '268 IPR, Exhibit 1031—Third Report of the National Cholesterol Education Program (NCEP) Expert Panel on Detection, Evaluation and Treatment of High Blood Cholesterol in Adults (Adult Treatment Panel III) Final Report, 106 Circulation 3143 (2002). (280 pages).
Adroca '268 IPR, Exhibit 1032—Michael Mayersohn, Principles and Applications of Pharmacokinetics, in Medical Toxicology 282 (Richard C. Dart ed., 3d ed. 2004). (58 pages).
Adroca '268 IPR, Exhibit 1033—Masashi Shiomi & Takashi Ito, MTP inhibitor decreases plasma cholesterol levels in LDL receptor-deficient WHHL rabbits by lowering the VLDL secretion, 431 Eur. J. of Pharmacology 127 (2001). (5 pages).
Adroca '268 IPR, Exhibit 1034—Declaration of Jeffery A. Marx, Aug. 10, 2015, (31 pages).
Adroca '268 IPR, Exhibit 1035—Press Release, Cigna Corp., Cigna Announces Appearance at CIBC Healthcare Conference (Nov. 7, 2003), http://newsroom.cigna.com/articledisplay.cfm?articleid=236. (3 pages).
Adroca '268 IPR, Exhibit 1036—Press Release, Gilead Scis., Gilead Sciences to Present at the 7th Annual Lehman Brothers Global Healthcare Conference on Friday, Mar. 5; Webcast Available Through Gilead Corporate Website (Mar. 4, 2004), http://gilead.com/news/press-releases/2004/3/gilead-sciences-to-present-a- t-the-7th-annual-lehman-brothers-global-healthcare-conference-on-friday-ma- rch-5th-webcast-available-through-gilead-corporate-website?mode=print. (1 page).
Adroca '268 IPR, Exhibit 1037—Press Release, PR Newswire, Dot Hill to Present at Robert W. Baird 2004 Growth Stock Conference (May 4, 2004), http://www.prnewswire.com/news-releases/dot-hill-to-present-at-robert-w-b-aird-2004-growth-stock-conference-73777807.html. (2 pages).
Adroca '268 IPR, Exhibit 1038—Margaret A. McDowell et al., Anthropometric Reference Data for Children and Adults: U.S.

(56) References Cited

OTHER PUBLICATIONS

Population, 1999-2002, CDC Advance Data From Vital & Health Stats. No. 361 (2005). (32 pages).
Aegerion Pharmaceuticals, Juxtapid™, FDA Approval 2012, 35 pages.
Aggarwal et al., "JTT-130, a microsomal triglyceride transfer protein (MTP) inhibitor lowers plasma triglycerides and LDL cholesterol concentrations without increasing hepatic triglycerides in guinea pigs", BMC Cardiovasc. Disord.; 5(1): 30, doi: 10.1186/1471-2261-5-30. (2005). (8 pages).
Aguilar-Salinas et al., "Efficacy and Safety of Atorvastatin in Hyperlipidemic, Type 2 Diabetic Patients. A 34-Week, Multicenter, Open-Label Study," Atherosclerosis. Oct. 2000; 152(2): 489-96.
Allain et al. "Enzymatic determination of total serum cholesterol", Clin Chem, Apr. 1974; 20(4): 470-5.
Amryt Pharma, "Efficacy and Safety of Lomitapide in Paediatric Patients With Homozygous Familial Hypercholesterolaemia (HoFH)", ClinicalTrials.gov NCT04681170, available at https://clinicaltrials.gov/ct2/show/NCT04681170, study started Dec. 2020, 9 pages.
Amryt Pharma, "LOWER: Lomitapide Observational Worldwide Evaluation Registry (LOWER)", ClinicalTrials.gov ID: NCT02135705, Study start date Mar. 18, 2014, (8 pages).
Angulo, P., et al., "The NAFLD fibrosis score: a noninvasive system that identifies liver fibrosis in patients with NAFLD", Hepatology, Apr. 2007; 45(4): 846-54.
Anonymous, "Bayer/PPD Implitapide Development Follows Zetia Model as Statin Add-on", The Pink Sheet, Feb. 16, 2004, 66(7): 17-18.
Atzel, A., et al., "Mechanism of Microsomal Triglyceride Transfer Protein Catalyzed Lipid Transport", Biochemistry, Oct. 5, 1993, 32(39): 10444-50.
Baddour, L., "PPD to Hold Analyst Day on Feb. 5, 2004", PPD News Releases, Jan. 15, 2004, Pharmaceutical Product Development, LLC, Wilmington, DE, USA (Pub), p. 1, http://www.ppdi.com. (1 page).
Bakillah, A., et al., "Decreased Secretion of ApoB Follows Inhibition of ApoB—MTP Binding by a Novel Antagonist", Biochemistry, Apr. 25, 2000, 39(16): 4892-9.
Barclay, L., "Hyperlipidemia", NMT Briefs, Thompson CenterWatch, 2003, Thompson, Boston, MA, USA (Pub), pp. 1-2.
Bayes, M., et al., "Gateways to Clinical Trials", Methods Find Exp Clin Pharmacol, Sep. 2002, 24(7): 431-55.
Bays and Stein, "Pharmacotherapy for Dyslipidaemia—Current Therapies and Future Agents", Expert Opin Pharmacother, Nov. 2003, 4(11): 1901-38.
Ben-Omran, T., et al., "Real-World 1-7Outcomes with Lomitapide Use in Paediatric Patients with Homozygous Familiar Hypercholesterolaemia", Adv Ther, Jul. 2019; 36(7): 1786-1811. Epub May 17, 2019.
Biller, S. A., "Isoprenoid (Phosphinylmethyl)phosphonates as Inhibitors of Squalene Synthetase", J Med Chem, Oct. 1988, 31(10): 1869-71.
Bischoff, H., et al., "BAY 13-9952 (Implitapide): Pharmacodynamic Effects of a New Microsomal Triglyceride Transfer Protein (MTP) Inhibitor on Plasma Lipids and Adipose Tissue in Animals", Eur Heart J 2000, Aug. 1, 2000, 21 (Abstract Suppl): 636 (Abstract# P3501). (1 page).
Blom, et al., "Long-Term Efficacy and Safety of the Microsomal Triglyceride Transfer Protein Inhibitor Lomitapide in Patients With Homozygous Familial Hypercholesterolemia", Circulation, Jul. 18, 2017; 136(3): 332-335.
Bruckert, "New Lipid-Modifying Therapies", Expert Opin. Investig. Drugs, (2003) 12(3): 325-35.
Capson, T. L., "Synthesis and Evaluation of Ammonium Analogs of Carbocationic Intermediates in Squalene Biosynthesis", PhD dissertation, Jun. 1987, Dept. Med. Chem. U. of Utah, Abstract (1 page).
Capuzzi et al., "Niacin Dosing: Relationship to Benefits and Adverse Effects", Curr Atheroscler Rep. Jan. 2, 2000(1): 64-71.
Catapano A. L., "Ezetimibe: A Selective Inhibitor of Cholesterol Absorption", Eur Heart J Suppl 2001, Jun. 2001, 3 (Suppl E): E6-E10.
Cefalu, A., et al., "Effectiveness and Safety of Lomitapide in a Patient With Familial Chylomicronemia Syndrome", Endocrine. Feb. 2021; 71(2): 344-350. Epub Oct. 2, 2020.
Cefalu, A., et al., "Lipid Management in Special Populations, Abstracts Lipid Management in Special Populations 11, Lomitapide Effectively Reduces Triglyceride (TG) Levels in Familial Chylomicronemia Syndrome (FCS) Study Funding", Abstracts/Atherosclerosis vol. 331, pp. e17-e17 Jan. 1, 2022.
Chandler et al., "CP-346086: an MTP inhibitor that lowers plasma cholesterol and triglycerides in experimental animals and in humans", J Lipid Res. Oct. 2003; 44(10): 1887-901. Epub Jul. 1, 2003.
Chang, G., et al., "Microsomal Triglyceride Transfer Protein (MTP) Inhibitors: Discovery of Clinically Active Inhibitors Using High-Throughput Screening and Parallel Synthesis Paradigms", Curr Opin Drug Discov Devel, Jul. 2002, 5(4): 562-70.
Clinical Trial NCT02765841 "Evaluate the Efficacy and Safety of Lomitapide in Pediatric Patients With Homozygous Familial Hypercholesterolemia on Stable Lipid-lowering Therapy", Aegerion Pharmaceuticals, Inc., Study start May 2016, 13 pages.
Corey, E. J. and Volante, R. P., 'Application of Unreactive Analogs of Terpenoid Pyrophosphates to Studies of Multistep Biosynthesis. Demonstration That "Presqualene Pyrophosphate" Is an Essential Intermediate on the Path to Squalene', J Amer Chem Soc, Mar. 1, 1976, 98(5): 1291-3.
Cuchel, M., et al., "Efficacy and safety of a microsomal triglyceride transfer protein inhibitor in patients with homozygous familial hypercholesterolaemia: a single-arm, open-label, phase 3 study", Lancet, Jan. 5, 2013; 381(9860): 40-6. Epub Nov. 2, 2012. (7 pages).
Cuchel, M., et al., "Inhibition of Microsomal Triglyceride Transfer Protein in Familial Hypercholesterolemia", N Engl J Med, Jan. 11, 2007, 356(2): 148-56.
De Montelieno, P. R., "Inhibition of Squalene Synthetase by Farnesyl Pyrophosphate Analogues", J Med Chem, Feb. 1977, 20(2): 243-9.
D'Erasmo, L., et al., "Efficacy and safety of lomitapide in homozygous familial hypercholesterolaemia: the pan-European retrospective observational study", Eur J Prev Cardiol, May 5, 2022; 29(5): 832-841.
D'Erasmo, L., et al., "Long-term efficacy of lipoprotein apheresis and lomitapide in the treatment of homozygous familial hypercholesterolemia (HoFH): a cross-national retrospective survey", Orphanet J Rare Dis, Sep. 8, 2021; 16(1): 381.
Earl and Kirkpatrick, "Ezetimibe", Nature Review, 2003, 2: 97-98.
Eshelman et al., "Investor Presentation, Pharmaceutical Product Development, Inc.", Feb. 2004, available electronically Apr. 15, 2004, 47 pages.
Evans, M. et al., "Medical Lipid-Regulating Therapy", Drugs, 2004, 64(11): 1181-96.
Ex. 1042: "Estimating the Safe Starting Dose in Clinical Trials for Therapeutics in Adult Healthy Volunteers", by B.G. Reigner, dated Sep. 7, 2016 in IPR2015-01836 (29 Pages).
Ex. 1043: Article "Guideline for Industry: Dose-Response Information to Support Drug Registration", dated Sep. 7, 2016 in IPR2015-01836 (17 Pages).
Ex. 1044 Article: "Estimating the Starting Dose for Entry Into Humans: Principles and Practice", by B.G. Reigner, dated Sep. 7, 2016 in IPR2015-01836 (11 Pages).
Ex. 1045: Sup. Dec.of Randall M. Zusman, M.D. in Support of Coalition for Affordable Drug Petition and Opp. to Motion to Amend, dated Sep. 7, 2016 in IPR2015-01836 (70 Pages).
Ex. 1046: NDA-11 NDA Approval: "Tablets Crestor (Rosuvastatin Calcium)", (PCC 630100), dated Sep. 7, 2016 in IPR2015-01836 (20 Pages).
Ex. 1047: NDA Approval Letter. Vytorin 10/10, Vytorin 10/20, Vytorin 10/40, Vytorin 10/80-10mg/Simvastatin 10, 20, 40, 80mg Tablets, dated Sep. 7, 2016 in IPR2015-01836 (42 Pages).
Ex. 1048: Article: "Zocor (Simvastatin)" by Merck & Co., Inc., dated Sep. 7, 2016, in IPR2015-01836 (16 Pages).
Ex. 1049: NDA 21-540 "Caduet (Amlodipine Besylate/Atorvastatin Calcium) Tablets" dated Sep. 7, 2016, in IPR2015-01836 (31 Pages).

(56) References Cited

OTHER PUBLICATIONS

Ex. 1050: "Lipitor (Atorvastatin Calcium) Tablets," dated Sep. 7, 2016, in IPR2015-01836 (16 Pages).
Ex. 1051: Article: "Zetia (Ezetimibe) Tablets," dated Sep. 7, 2016, in IPR2015-01836 (17 Pages).
Ex. 1054: Deposition of Frank Sacks, dated Sep. 7, 2016, in IPR2015-01836 (66 Pages).
Ex. 1055: Deposition Testimony of Daniel J. Rader, M.D., dated Sep. 7, 2016. (66 pages).
Ex. 1056: Video Deposition of Thomas A. Baillie, Ph. D. (Aug. 25, 2016), dated Sep. 7, 2016, in IPR2015-01836 (123 Pages).
Ex. 1057: Dec. of C. Casieri in Support of Coalition for Affordable Drugs Pet. for Inter Partes Rev. & Opp to Amend, dated Sep. 28, 2016, in IPR2015-01836 (5 Pages).
Ex. 1057: Deposition of Thomas A. Baillie, Ph.D., D.Sc., dated Oct. 25, 2016, in IPR2015-01836 (63 Pages).
Ex. 2001 to Patent Owner Preliminary Response dated Dec. 8, 2015, in Inter Partes Review Case No. IPR2015-01836 for U.S. Pat. No. 7,932,268 titled "Patent License Agreement between the Trustees of the University of Pennsylvania and Aegerion Pharmaceuticals, Inc.," dated May 19, 2006 (54 pages).
Ex. 2001 to Patent Owner Preliminary Response dated Dec. 8, 2015 in Inter Partes Review Case No. IPR2015-01835 for U.S. Pat. No. 8,618,135 titled "Patent License Agreement between the Trustees of the University of Pennsylvania and Aegerion Pharmaceuticals, Inc.", dated May 19, 2008 (54 pages).
Ex. 2002 to Patent Owner Preliminary Response dated Dec. 8, 2015, IPR2015-01835, "NDA #203858, Sponsor's Background Package for the Endocrinologic and Metabolic Drugs Advisory Committee Meeting, Advisory Committee Briefing Materials (Oct. 17, 2012)." (125 pages).
Ex. 2002 to Patent Owner Preliminary Response dated Dec. 8, 2015, IPR2015-01836, "NDA #203858, Sponsor's Background Package for the Endocrinologic and Metabolic Drugs Advisory Committee Meeting", Advisory Committee Briefing Materials (Oct. 17, 2012). (125 pages).
Ex. 2003 to Patent Owner Preliminary Response dated Dec. 8, 2015, IPR2015-01835, "ClinicalTrials.gov: Safety, Tolerability, and Efficacy of Microsomal Triglyceride Protein (MTP) Inhibitor, available at https://clinicaltrials.gov/ct2/show/NCT01556906?term=NCT01556906&rank=1." (4 pages).
Ex. 2003 to Patent Owner Preliminary Response dated Dec. 8, 2015, IPR2015-01836, ClinicalTrials.gov ID: NCT01556906, "Safety, Tolerability, and Efficacy of Microsomal Triglyceride Protein (MTP) Inhibitor", available at https://clinicaltrials.gov/ct2/show/NCT01556906?term=NCT01556906&rank=1. (4 pages).
Ex. 2004 to Patent Owner Preliminary Response dated Dec. 8, 2015, IPR2015-01835, Marina Cuchel et al., "Inhibition of Microsomal Triglyceride Transfer Protein in Familial Hypercholesterolemia", 356 (2) N. Eng. J. Med. 148-56 (Jan. 11, 2007), (9 pages).
Ex. 2004 to Patent Owner Preliminary Response dated Dec. 8, 2015, IPR2015-01836, Marina Cuchel et al., "Inhibition of Microsomal Triglyceride Transfer Protein in Familial Hypercholesterolemia", 356 (2) N. Eng. J. Med. 148-56 (Jan. 11, 2007), (9 pages).
Ex. 2005 to Patent Owner Preliminary Response dated Dec. 8, 2015, IPR2015-01835, U.S. Appl. No. 14/075,483, Amendment and Response to Final Office Action (dated Nov. 30, 2015). (9 pages).
Ex. 2005 to Patent Owner Preliminary Response dated Dec. 8, 2015, IPR2015-01836, U.S. Appl. No. 14/075,483, Amendment and Response to Final Office Action (dated Nov. 30, 2015). (9 pages).
Ex. 2006 to Patent Owner Preliminary Response dated Dec. 8, 2015, IPR2015-01835, "FDA News Release, FDA approves new orphan drug for rare cholesterol disorder", available at http://www.fda.gov/NewsEvents/Newsroom/PressAnnouncements/ucm333285.htm (Dec. 26, 2012). (2 pages).
Ex. 2006 to Patent Owner Preliminary Response dated Dec. 8, 2015, IPR2015-01836, "FDA News Release, FDA approves new orphan drug for rare cholesterol disorder", available at http://www.fda.gov/NewsEvents/Newsroom/PressAnnouncements/ucm333285.htm (Dec. 26, 2012). (2 pages).

Ex. 2007 to Patent Owner Preliminary Response dated Dec. 8, 2015, IPR2015-01835, Marina Cuchel et al., "Efficacy and safety of a microsomal triglyceride transfer protein inhibitor in patients with homozygous familial hypercholesterolemia: a single-arm, openlabel, phase 3 study", 381 The Lancet 40-46 (Jan. 5, 2013), (7 pages).
Ex. 2007 to Patent Owner Preliminary Response dated Dec. 8, 2015, IPR2015-01836, Marina Cuchel et al., "Efficacy and safety of a microsomal triglyceride transfer protein inhibitor in patients with homozygous familial hypercholesterolemia: a single-arm, open-label, phase 3 study", 381 The Lancet 40-46 (Jan. 5, 2013), (7 pages).
Ex. 2008 to Patent Owner Preliminary Response dated Dec. 8, 2015, IPR2015-01835, Joseph Walker et al., "New Hedge Fund Strategy: Dispute the Patent, Short the Stock", The Wall Street Journal, available at http://www.wsj.com/articles/hedgefundmanagerkylebasschallengesjazzpharmaceuticalspatent1428417408 (Apr. 7, 2015). (4 pages).
Ex. 2008 to Patent Owner Preliminary Response dated Dec. 8, 2015, IPR2015-01836, Joseph Walker et al., "New Hedge Fund Strategy: Dispute the Patent, Short the Stock", The Wall Street Journal (Apr. 7, 2015), available at http://www.wsj.com/articles/hedgefundmanagerkylebasschallengesjazzpharmaceuticalspatent1428417408. (4 pages).
Ex. 2009 to Patent Owner Preliminary Response dated Dec. 8, 2015, IPR2015-01835, U.S. Appl. No. 13/046,118: Information Disclosure Statement (IDS) (Sep. 28, 2011). (20 pages).
Ex. 2010 to Patent Owner Preliminary Response dated Dec. 8, 2015, IPR2015-01835, "Patentee's Observations in reply to the Notice of Opposition by Dr. Evan Stein", European Patent No. 1 725 234 IPR2015-01835, Patent Owner Preliminary Response. (6 pages).
Ex. 2010 to Patent Owner Preliminary Response dated Dec. 8, 2015, IPR2015-01836, "Patentee's Observations in reply to the Notice of Opposition by Dr. Evan Stein", European Pat. No. 1 725 234 IPR2015-01836. (6 pages).
Ex. 2011 to Patent Owner Preliminary Response dated Dec. 8, 2015, IPR2015-01835, "The Pink Sheet, MTP Inhibitor research discontinued", (Jul. 31, 2000). (1 page).
Ex. 2011 to Patent Owner Preliminary Response dated Dec. 8, 2015, IPR2015-01836, "The Pink Sheet, MTP inhibitor research discontinued", (Jul. 31, 2000). (1 page).
Ex. 2012 to Patent Owner Preliminary Response dated Dec. 8, 2015 in Inter Partes Review Case No. IPR2015-01835 for U.S. Pat. No. 8,618, 135 titled "U.S. Securities and Exchange Commission Form 10-K [in the name of] Aegerion Pharmaceuticals, Inc.", dated Mar. 2, 2015 (522 pages).
Ex. 2012 to Patent Owner Preliminary Response dated Dec. 8, 2015 in Inter Partes Review Case No. IPR2015-01836 for U.S. Pat. No. 7,932,268 titled "U.S. Securities and Exchange Commission Form 10-K [in the name of] Aegerion Pharmaceuticals, Inc.," dated Mar. 2, 2015 (522 pages).
Ex. 2013 to Patent Owner Preliminary Response dated Dec. 8, 2015 in Inter Partes Review Case No. IPR2015-01835 for U.S. Pat. No. 8,618, 135 titled "U.S. Securities and Exchange Commission Form 10-K [in the name of] Aegerion Pharmaceuticals, Inc.," dated Mar. 18, 2013 (133 pages).
Ex. 2013 to Patent Owner Preliminary Response dated Dec. 8, 2015 in Inter Partes Review Case No. IPR2015-01836 for U.S. Pat. No. 7,932,268 6 titled "U.S. Securities and Exchange Commission Form 10-K [in the name of] Aegerion Pharmaceuticals, Inc.", dated Mar. 18, 2013 (133 pages).
Ex. 2014 to Patent Owner Preliminary Response dated Dec. 8, 2015, IPR2015-01835, "Aegerion Pharmaceuticals, Inc., Third Quarter 2015 Earnings Conference Call", available at http://files.shareholder.com/downloads/AEGR/0x0x860375/8F9C1576-D084-454D--BBCFC656C341E238/AEGR_Q3_15_Slides_Final.pdf(Nov. 9, 2015). (8 pages).
Ex. 2014 to Patent Owner Preliminary Response dated Dec. 8, 2015, IPR2015-01836, "Aegerion Pharmaceuticals, Inc., Third Quarter 2015 Earnings Conference Call", available at http://files.shareholder.com/downloads/AEGR/0x0x860375/8F9C1576-D084-45-4D-BBCFC656C341E238/AEGR_Q3_15_Slides_Final.pdf(Nov. 9, 2015). (8 pages).

(56) References Cited

OTHER PUBLICATIONS

Ex. 2015 to Patent Owner Preliminary Response dated Dec. 8, 2015, IPR2015-01835, "Juxtapid label (2012)", (35 pages).
Ex. 2015 to Patent Owner Preliminary Response dated Dec. 8, 2015, IPR2015-01836, "JUXTAPID label (2012)", (35 pages).
Ex. 2016 to Patent Owner Preliminary Response dated Dec. 8, 2015, IPR2015-01835, "Center for Drug Evaluation and Research, Application No. 203858Orig1s00, Summary Basis for Regulatory Action", (Dec. 21, 2012). (18 pages).
Ex. 2016 to Patent Owner Preliminary Response dated Dec. 8, 2015, IPR2015-01836, "Center for Drug Evaluation and Research, Application No. 203858Orig1s00, Summary Basis for Regulatory Action", (Dec. 21, 2012). (18 pages).
Ex. 2018 to Updated List of Patent Owner's Exhibits dated Jun. 7, 2016, IPR2015-01835, Michael Mayersohn, "Designing a Dosage Regimen: Drug Therapy", Clin. Ther., vol. 10, No. 10 (Oct. 1980). (8 pages).
Ex. 2019 to Updated List of Patent Owner's Exhibits dated Jun. 7, 2016, IPR2015-01835, Peter Jones et al., "Comparative Dose Efficacy Study of Atorvastatin Versus Simvastatin, Pravastatin, Lovastatin, and Fluvastatin in Patients With Hypercholesterolemia (The CURVES Study)", Am. J. Cardiol., vol. 81 (Mar. 1, 1998). (6 pages).
Ex. 2020 to Updated List of Patent Owner's Exhibits dated Jun. 7, 2016, IPR2015-01835, Jeffrey A. Robl et al., "A Novel Series of Highly Potent Benzimidazole-Based Microsomal Triglyceride Transfer Protein Inhibitors", J. Med. Chem., vol. 44, No. 6 (Mar. 15, 2001). (6 pages).
Ex. 2021 to Updated List of Patent Owner's Exhibits dated Jun. 7, 2016, IPR2015-01835, Deposition Transcript of Michael Mayersohn, Ph. D. (May 16, 2016). (268 pages).
Ex. 2022 to Updated List of Patent Owner's Exhibits dated Jun. 7, 2016, IPR2015-01835, Deposition Transcript of Randall M. Zusman, M.D. (May 19, 2016). (198 pages).
Ex. 2023 to Updated List of Patent Owner's Exhibits dated Jun. 7, 2016, IPR2015-01835, Declaration of Dr. Frank Seeks, M.D., (106 pages).
Ex. 2024 to Updated List of Patent Owner's Exhibits dated Jun. 7, 2016, IPR2015-01835, Declaration of Dr. Thomas A. Baillie, Ph.D., D.Sc., (77 pages).
Ex. 2025 to Updated List of Patent Owner's Exhibits dated Jun. 7, 2016, IPR2015-01835, Declaration of S. David Kimball, Ph.D., (75 pages).
Ex. 2026 to Updated List of Patent Owner's Exhibits dated Jun. 7, 2016, IPR2015-01835, Declaration of Daniel J. Rader, M.D., (31 pages).
Ex. 2027 to Updated List of Patent Owner's Exhibits dated Jun. 7, 2016, IPR2015-01835, Dr. Frank Sacks, M.D., curriculum vitae, (38 pages).
Ex. 2028 to Updated List of Patent Owner's Exhibits dated Jun. 7, 2016, IPR2015-01835, Dr. Thomas A. Baillie, Ph.D., D.SC., curriculum vitae, (38 pages).
Ex. 2029 to Updated List of Patent Owner's Exhibits dated Jun. 7, 2016, IPR2015-01835, "S. David Kimball, Ph.D., curriculum vitae", (9 pages).
Ex. 2030 to Updated List of Patent Owner's Exhibits dated Jun. 7, 2016, IPR2015-01835, Daniel J. Rader, M.D., curriculum vitae, (66 pages).
Ex. 2031 to Updated List of Patent Owner's Exhibits dated Jun. 7, 2016, IPR2015-01835, Dr. Frank Sacks, M.D., Materials Considered, (11 pages).
Ex. 2032 to Updated List of Patent Owner's Exhibits dated Jun. 7, 2016, IPR2015-01835, Dr. Thomas A. Baillie, Ph.D., D.SC., Materials Considered, (3 pages).
Ex. 2033 to Updated List of Patent Owner's Exhibits dated Jun. 7, 2016, IPR2015-01835, David Kimball, Ph.D., Materials Considered, (4 pages).
Ex. 2034 to Updated List of Patent Owner's Exhibits dated Jun. 7, 2016, IPR2015-01835, Malcolm Rowland et al., "Clinical Pharmacokinetics: Concepts and Applications", William and Wilkins (1995), pp. 1-30.
Ex. 2034 to Updated List of Patent Owner's Exhibits dated Jun. 7, 2016, IPR2015-01835, Malcolm Rowland et al., "Clinical Pharmacokinetics: Concepts and Applications", William and Wilkins (1995), pp. 142-170.
Ex. 2034 to Updated List of Patent Owner's Exhibits dated Jun. 7, 2016, IPR2015-01835, Malcolm Rowland et al., "Clinical Pharmacokinetics: Concepts and Applications", William and Wilkins (1995), pp. 171-198.
Ex. 2034 to Updated List of Patent Owner's Exhibits dated Jun. 7, 2016, IPR2015-01835, Malcolm Rowland et al., "Clinical Pharmacokinetics: Concepts and Applications", William and Wilkins (1995), pp. 199-229.
Ex. 2034 to Updated List of Patent Owner's Exhibits dated Jun. 7, 2016, IPR2015-01835, Malcolm Rowland et al., "Clinical Pharmacokinetics: Concepts and Applications", William and Wilkins (1995), pp. 31-62.
Ex. 2034 to Updated List of Patent Owner's Exhibits dated Jun. 7, 2016, IPR2015-01835, Malcolm Rowland et al., "Clinical Pharmacokinetics: Concepts and Applications", William and Wilkins (1995), pp. 63-141.
Ex. 2035 to Updated List of Patent Owner's Exhibits dated Jun. 7, 2016, IPR2015-01835, Sharon A. Huang et al., "Phosphodiesterase-5 (PDE5) Inhibitors in the Management of Erectile Dysfunction", P T, vol. 38, No. 7, pp. 407-419 (Jul. 2013).
Ex. 2036 to Updated List of Patent Owner's Exhibits dated Jun. 7, 2016, IPR2015-01835, "Heinz Lullmann et al., Lipidosis Induced by Amphiphillic Cationic Drugs, Biochem", Pharmacol., vol. 27, pp. 1103-1108 (1978).
Ex. 2037: Supplemental Materials Considered by Thomas A. Baillie, Ph.D., D.Sc., dated Oct. 7, 2016, in IPR2015-01836 (2 Pages).
Ex. 2037 to Updated List of Patent Owner's Exhibits dated Jun. 7, 2016, IPR2015-01835, Jan-Peter H. T. M. Ploemen et al., "Use of physiochemical calculation of pKa and CLogP to predict phospholipidosis-inducing potential: A case study with structurally related piperazines", Exp. Toxic Pathol., vol. 55, pp. 347-355 (2004).
Ex. 2038 to Updated List of Patent Owner's Exhibits dated Jun. 7, 2016, IPR2015-01835, Andrea Cavelli et al., "Toward a pharmacophore for drugs inducing the long QT syndrome: insights from a CoMFA study of Herg K(+) channel blockers", J. Med. Chem., vol. 45, pp. 3844-3853 (2002).
Ex. 2039 to Updated List of Patent Owner's Exhibits dated Jun. 7, 2016, IPR2015-01835, John S. Walsh et al., "The Metabolic Activation of Abacavir by Human Liver Cytosol and Expressed Human Alcohol Dehydrogenase Isozymes", Chem. Biol. Interact., vol. 142, pp. 135-154 (2002).
Ex. 2040 to Updated List of Patent Owner's Exhibits dated Jun. 7, 2016, IPR2015-01835, Jean F. Le Bigot et al., "Metabolism of Ketotifen by Human Liver Microsomes", Drug Metab. Dispos., vol. 11, pp. 585-589 (1983).
Ex. 2041 to Updated List of Patent Owner's Exhibits dated Jun. 7, 2016, IPR2015-01835, "Press Release, Aegerion Pharmaceuticals, FDA Advisory Committee Recommends Approval of Lomitapide for Treatment of Homozygous Familial Hypercholesterolemia (HoFH)", (Oct. 17, 2012). (2 pages).
Ex. 2042 to Updated List of Patent Owner's Exhibits dated Jun. 7, 2016, IPR2015-01835, "Pharmaceutical Product Development, Inc., Annual Report (Form 10-K)", (Dec. 31, 2005). (148 pages).
Ex. 2043 to Updated List of Patent Owner's Exhibits dated Jun. 7, 2016, IPR2015-01835, Frank M. Sacks et al., "Severe Hypertriglyceridemia With Pancreatitis: Thirteen Years' Treatment With Lomitapide", JAMA Intern. Med., vol. 174, No. 3 (Mar. 2014). (5 pages).
Ex. 2044 to Updated List of Patent Owner's Exhibits dated Jun. 7, 2016, IPR2015-01835, Internet Archive WayBack, Machine Error Message (Jun. 6, 2016). (1 page).
Ex. 2045 to Updated List of Patent Owner's Exhibits dated Jun. 7, 2016, IPR2015-01835, Internet Archive WayBack Machine, PPD Analyst/Investor Day: Dapoxetine. (15 pages).
Ex. 2046 to Updated List of Patent Owner's Exhibits dated Jun. 7, 2016, IPR2015-01835, Internet Archive WayBack Machine, PPD Analyst/Investor Day: DP4 Inhibitor. (26 pages).

(56) References Cited

OTHER PUBLICATIONS

Ex. 2050 to Updated List of Patent Owner's Exhibits dated Jun. 7, 2016, IPR2015-01835, "Patent Owner's Motion to Amend Under 37 C.F.R. sctn 42.121", (42 pages).
Ex. 2051 to Updated List of Patent Owner's Exhibits dated Jun. 7, 2016, IPR2015-01835, Marjel van Dam et al., "Efficacy and Safety of Implitapide (Bay 13-9952), a Microsomal Triglyceride Transfer Protein Inhibitor, in Patients with Primary Hypercholesterlemia, Stein Phase I Study (2001)", (13 pages).
Ex. 2052 to Updated List of Patent Owner's Exhibits dated Jun. 7, 2016, IPR2015-01835, Daru Sharp et al., "Cloning and gene defects in microsomal triglyceride transfer protein associated with abetalipoproteinaemia", Nature 365, 65-69 (Sep. 2, 1993).
Ex. 2053 to Updated List of Patent Owner's Exhibits dated Jun. 7, 2016, IPR2015-01835, Marc A. Pfeffer et al., "Safety and tolerability of pravastatin in long-term clinical trials", Prospective Pravastatin Pooling (PPP) Project, Circ. (May 21, 2002), (6 pages).
Ex. 2054 to Updated List of Patent Owner's Exhibits dated Jun. 7, 2016, IPR2015-01835, J. D. Adams et al., "Studies on the biotransformation of ketamine. I—Identification of metabolites produced in vitro from rat liver microsomal preparations", Bio. Mass Spectrom., vol. 8, No. 8 (Aug. 1981), (13 pages).
Ex. 2055 to Updated List of Patent Owner's Exhibits dated Jun. 7, 2016, IPR2015-01835, "Richard E. Gregg, M.D., curriculum vitae", (18 pages).
Ex. 2056 to Updated List of Patent Owner's Exhibits dated Jun. 7, 2016, IPR2015-01835, John R. Wetterau et al., "Absence of Microsomal Triglyceride Transfer Protein in Individuals with Abetalipoproteinemia", Science, vol. 258 (Nov. 6, 1992), (4 pages).
Ex. 2057 to Updated List of Patent Owner's Exhibits dated Jun. 7, 2016, IPR2015-01835, "Bristol Meyers Squibb, Clinical Study Report, The Effects of Chronic Dosing of BMS-201038 on Hepatic Fat Accumulation and Reversibility as Assessed by Nuclear Magnetic Resonance Spectroscopy (NMRS)", (Jan. 2002) (filed under seal), (6 pages).
Ex. 2058 to Updated List of Patent Owner's Exhibits dated Jun. 7, 2016, IPR2015-01835, "Bristol Meyers Squibb, BMS-201038 Investigator Brochure General Addendum (Oct. 1997)", (4 pages).
Ex. 2059 to Updated List of Patent Owner's Exhibits dated Jun. 7, 2016, IPR2015-01835, Adrian Albert, Xenobiosis: Food, Drugs and Poisons in the Human Body, Chapman & Hall (1987). (5 pages).
Ex. 2060 to Updated List of Patent Owner's Exhibits dated Jun. 7, 2016, IPR2015-01835, "Goodman, et al., Goodman & Gilman's the Pharmacological Basis of Therapeutics", Macmillan Publishing Company, (1985), (3 pages).
Ex. 2061 to Updated List of Patent Owner's Exhibits dated Jun. 7, 2016, IPR2015-01835, Han van de Waterbeemd et al., "ADMET in Silico Modelling: Towards Prediction Paradise?", Nat. Rev. Drug. Discov., vol. 2, No. 3, pp. 192-204 (2003).
Ex. 2062 to Updated List of Patent Owner's Exhibits dated Jun. 7, 2016, IPR2015-01835, "35 FDA-Approved Prescription Drugs Later Pulled from the Market" (Jan. 30, 2014, 1:09 PM), http://prescriptiondrugs.procon.org/view.resource.php?resourceID=005528, (23 pages).
Ex. 2063 to Updated List of Patent Owner's Exhibits dated Jun. 7, 2016, IPR2015-01835, William H. Halliwell, "Cationic Amphiphilic Drug-Induced Phospholipidosis", Toxicol. Pathol., vol. 25, pp. 53-60 (1997).
Ex. 2064 to Updated List of Patent Owner's Exhibits dated Jun. 7, 2016, IPR2015-01835, Holger Fischer et al., "CAFCA: A Novel Tool for the Calculation of Amphiphilic Properties of Charged Drug Molecules", CHIMIA, vol. 54, No. 11, pp. 640-645 (2000).
Ex. 2065 to Updated List of Patent Owner's Exhibits dated Jun. 7, 2016, IPR2015-01835, R. Preston Mason, et al., "Reevaluating Equilibrium and Kinetic Binding Parameters for Lipophilic Drugs Based on a Structural Model for Drug Interaction with Biological Membranes", J. Med. Chem., vol. 34, No. 2, pp. 869-877 (Mar. 1991).
Ex. 2066 to Updated List of Patent Owner's Exhibits dated Jun. 7, 2016, IPR2015-01835, Martin Tristani-Firouzi, et al., "Molecular Biology of K+ Channels and Their Role in Cardiac Arrhythmias", Am. J. Med., vol. 110, pp. 50-59 (2001).
Ex. 2067 to Updated List of Patent Owner's Exhibits dated Jun. 7, 2016, IPR2015-01835, Mark E. Curran, et al., "A Molecular Basis for Cardiac Arrhythmia: HERG Mutations Cause Long QT Syndrome", Cell, vol. 80, pp. 795-803 (1995).
Ex. 2068 to Updated List of Patent Owner's Exhibits dated Jun. 7, 2016, IPR2015-01835, Bernadr Fermini et al., "Pre-Clinical Assessment of Drug-Induced QT Interval Prolongation", Current Issues and Impact on Drug Discovery, Annu. Rep. Med. Chem., vol. 39, pp. 323-333, (2004).
Ex. 2069 to Updated List of Patent Owner's Exhibits dated Jun. 7, 2016, IPR2015-01835, William Crumb et al., "QT Interval Prolongation by Non-cardiovascular Drugs: Issues and Solutions for Novel Drug Development", Pharm. Sci. Technol. Today, vol. 2, No. 7, pp. 270-280 (1999).
Ex. 2070 to Updated List of Patent Owner's Exhibits dated Jun. 7, 2016, IPR2015-01835, Man-Wai Lo, et al., "Pharmacokinetics of losartan, an angiotensin II receptor antagonist, and its active metabolite EXP3174 in humans", Clin. Pharmacol. Ther., vol. 58, No. 6, pp. 641-649, (1995).
Ex. 2071 to Updated List of Patent Owner's Exhibits dated Jun. 7, 2016, IPR2015-01835, Stephen J. Cutler et al., Wilson and Grisvold's Textbook of Organic Medicinal and Pharmaceutical Chemistry, 65-66 (11th ed. 2004). (3 pages).
Ex. 2072 to Updated List of Patent Owner's Exhibits dated Jun. 7, 2016, IPR2015-01835, Christopher P. Cannon et al., "Intensive versus Moderate Lipid Lowering with Statins after Acute Coronary Syndromes", N. Eng. J. Med., vol. 350, No. 15 (Apr. 8, 2004). (10 pages).
Ex. 2073 to Updated List of Patent Owner's Exhibits dated Jun. 7, 2016, IPR2015-01835, "List of Prior Art Reviewed by Frank Sacks, M.D. for Motion to Amend", (10 pages).
Ex. 2074 to Updated List of Patent Owner's Exhibits dated Jun. 7, 2016, IPR2015-01835, H. Mabuchi et al., "Causes of death in patients with familial hypercholesterolemia", Atherosclerosis, vol. 61, No. 1, pp. 1-6, (1986).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016) pp. 106-130.
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016) pp. 1-18. (37 pages).
Ex. 2075 to Updated list of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016) pp. 131-151. (41 pages).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016) pp. 152-174. (38 pages).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)" (Mar. 15, 2016), pp. 19-34. (32 pages).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016), pp. 35-51. (34 pages).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016) pp. 52-67. (32 pages).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016) pp. 68-85 (36 pages).
Ex. 2075 to Updated List of Patent Owner's Exhibits dated Jun. 7, 2016, IPR2015-01835, "Aegerion Pharmaceuticals, Inc., U.S. Securities and Exchange Commission (Form 10-K)", (Mar. 15, 2016), pp. 86-105. (38 pages).

(56) References Cited

OTHER PUBLICATIONS

Ex. 2076: Aegerion Form 10Q Part 6 of 6, Table of Contents, dated Jul. 29, 2016, in IPR2015-01836 (19 Pages).
Ex. 2076 to Updated List of Patent Owner's Exhibits dated Jun. 7, 2016, IPR2015-01835, "Aegerion Pharmaceuticals, Inc., U.S. Securities and Exchange Commission (Form 10-Q)", (May 16, 2016), pp. 1-25. (47 pages).
Ex. 2076 to Updated List of Patent Owner's Exhibits dated Jun. 7, 2016, IPR2015-01835, "Aegerion Pharmaceuticals, Inc., U.S. Securities and Exchange Commission (Form 10-Q)", (May 16, 2016), pp. 26-42, (35 pages).
Ex. 2076 to Updated List of Patent Owner's Exhibits dated Jun. 7, 2016, IPR2015-01835, "Aegerion Pharmaceuticals, Inc., U.S. Securities and Exchange Commission (Form 10-Q)", (May 16, 2016), pp. 43-59. (33 pages).
Ex. 2076 to Updated List of Patent Owner's Exhibits dated Jun. 7, 2016, IPR2015-01835, "Aegerion Pharmaceuticals. Inc., U.S. Securities and Exchange Commission (Form 10-Q)", (May 16, 2016), pp. 60-74. (30 pages).
Ex. 2076 to Updated List of Patent Owner's Exhibits dated Jun. 7, 2016, IPR2015-01835, "Aegerion Pharmaceuticals, Inc., U.S. Securities and Exchange Commission (Form 10-Q)", (May 16, 2016), pp. 75-91. (34 pages).
Ex. 2076 to Updated List of Patent Owner's Exhibits dated Jun. 7, 2016, IPR2015-01835, "Aegerion Pharmaceuticals, Inc., U.S. Securities and Exchange Commission (Form 10-Q)", (May 16, 2016), pp. 92-102. (19 pages).
Ex. 2077 to Updated List of Patent Owner's Exhibits dated Jun. 7, 2016, IPR2015-01835, Dec. 2002 Final Clinical Trial Protocol Submitted to Institutional Review Board. (72 pages).
Ex. 2078 to Updated List of Patent Owner's Exhibits dated Jun. 7, 2016, IPR2015-01835, "BMS-201038 Investigator Brochure General Addendum CV145-002, Multiple Dose PO", (Oct. 1, 1997), (4 pages).
Ex. 2079 to Updated List of Patent Owner's Exhibits dated Jun. 7, 2016, IPR2015-01835, Clinical Study Approval, (Mar. 20, 2003), (6 pages).
Ex. 2080 to Updated List of Patent Owner's Exhibits dated Jun. 7, 2016, IPR2015-01835, "Abbreviated Clinical Study Report for CV145-009" (Jan. 7, 2002), (6 pages).
Ex. 2081 to Updated List of Patent Owner's Exhibits dated Jun. 7, 2016, IPR2015-01835, "Interim Clinical Study Summary Submitted to the Dorris Duke Charitable Foundation", (Oct. 2003), (filed under seal), (2 pages).
Ex. 2082 to Updated List of Patent Owner's Exhibits dated Jun. 7, 2018, IPR2015-01835, "Memorandum Summarizing Results of Clinical Trial", (Feb. 9, 2004) (filed under seal). (42 pages).
Ex. 2083 to Updated List of Patent Owner's Exhibits dated Jun. 7, 2016, IPR2015-01835, Declaration of Richard E. Gregg, (13 pages).
Ex. 2084 to Updated List of Patent Owner's Exhibits dated Jun. 7, 2016, IPR2015-01835, "Aegerion Pharmaceuticals 2013 Annual Report", (6 pages).
Ex. 2085 to Updated List of Patent Owner's Exhibits dated Jun. 7, 2016, IPR2015-01835, Marina Cuchel et al., "Homozygous familial hypercholesterolaemia: new insights and guidance for clinicians to improve detection and clinical management. A position paper from the Consensus Panel on Familial Hypercholesterolaemia of the European Atherosclerosis Society", Eur. Heart J., 35, at 2146-2157 (2014), (14 pages).
Ex. 2086 to Updated List of Patent Owner's Exhibits dated Jun. 7, 2016, IPR2015-01835, Visioli, F., "Microsomoal triglyceride transfer protein inhibitors", Current Opinion in Cardiovascular, Pulmonary & Renal Investigational Drugs 2000 2(3): 292-293, (2 pages).
Ex. 2087 to Updated List of Patent Owner's Exhibits dated Jun. 7, 2016, IPR2015-01835, Williams, S et al., "Novel microsomal triglyceride transfer protein inhibitors", Expert Opin. Ther. Patents (2003) 13(4): 479-488, (10 pages).
Ex. 2088 to Updated List of Patent Owner's Exhibits dated Jun. 7, 2016, IPR2015-01835, Funatsu, T. et al. "Atorvastatin Increases Hepatic Fatty Acid Beta-Oxidation in Sucrose-Fed Rats: Comparison with an MTP Inhibitor", European Journal of Pharmacology 455 (2002) 161-167, (9 pages).
Ex. 2089 to Updated List of Patent Owner's Exhibits dated Jun. 7, 2016, IPR2015-01835, Barclay, L., "Hyperlipidemia", NMT Briefs, 2003, 1-4, (4 pages).
Ex. 2090 to Updated List of Patent Owner's Exhibits dated Jun. 7, 2016, IPR2015-01835, Evans, M., et al., "Medical Lipid-Regulating Therapy: Current Evidence, Ongoing Trials and Future Developments", Drugs 2004: 64 (11): 1181-1196, (16 pages).
Ex. 2103 to Updated List of Patent Owner's Exhibits dated Jun. 7, 2016, IPR2015-01835, van Dam, M.J., "Dyslipidemia; diagnosis and treatment, Dissertation", UvA-DARE, 2001, 147-157, (12 pages).
Ex. 2104 to Updated List of Patent Owner's Exhibits dated Jun. 7, 2016, IPR2015-01835, "U.S. National Institutes of Health, Implitapide in Patients With Hypertriglyceridemia on Maximal, Concurrent Triglyceride-Lowering Therapy", NIH Clinical Trials.gov ID No. NT0008013, 2004, 1-3, (3 pages).
Ex. 2105 to Updated List of Patent Owner's Exhibits dated Jun. 7, 2016, IPR2015-01835, "U.S. National Institutes of Health, Implitapide in Patients With Homozygous Familial Hypercholesterolemia on Maximal Concurrent Lipid-Lowering Therapy", NIH Clinical Trials.gov ID No. NCT00079846, 2003, 1-3, (3 pages).
Ex. 2106 to Updated List of Patent Owner's Exhibits dated Jun. 7, 2016, IPR2015-01835, Baddour, L. et al., "PPD to Hold Analyst Day on Feb. 5, 2004", (Jan. 15, 2004), (48 pages).
Ex. 2107 to Updated List of Patent Owner's Exhibits dated Jun. 7, 2016, IPR2015-01835, Gruetzmann R., et al., "Implitapide inhibits secretion of apoB-associated lipoproteins by inhibition of the MTP," Eur. Heart J. 2000, 21 (Suppl), Abst 3271, p. 600. (1 page).
Ex. 2108 to Updated List of Patent Owner's Exhibits dated Jun. 7, 2016, IPR2015-01835, Bischoff, H., et al., "Bay 13-9952 (implitapide): pharmacodynamic effects of a new MTP inhibitor on plasma lipids and adipose tissue in animals", Eur. Heart J. 2000, 21 (Suppl), Abst P3501, p. 636, (1 page).
Ex. 2109 to Updated List of Patent Owner's Exhibits dated Jun. 7, 2016, IPR2015-01835, Zaiss, S., et al., "Bay 13-9952 (Implitapide), an inhibitor of the MTP, inhibits atherosclerosis and prolongs lifetime in apo-E knockout mice", Eur. Heart J. 2000, 21 (Suppl), Abst 194, p. 16, (1 page).
Ex. 2110 to Updated List of Patent Owner's Exhibits dated Jun. 7, 2016, IPR2015-01835, Bayes, M., et al., "Gateways to Clinical Trials", Methods Find Exp Clin Pharmacol 2002, 24(1): 37-55, (19 pages).
Ex. 2111 to Updated List of Patent Owner's Exhibits dated Jun. 7, 2016, IPR2015-01835, Sorbera, L.A., et al., "Implitapide", Drugs of the Future, 2000, 25(11): 1138-1144, (7 pages).
Ex. 2123 to Updated List of Patent Owner's Exhibits dated Jun. 7, 2016, IPR2015-01835, Aguilar-Salinas, C., et al., "Efficacy and safety of atorvastatin in hyperlipidemic, type 2 diabetic patients. A 34-week, multicenter, open-label study", Elsevier, Atheroslerosis, 2000, 489-496, (8 pages).
Ex. 2124 to Updated List of Patent Owner's Exhibits dated Jun. 7, 2016, IPR2015-01835, Capuzzi, D., et al., "Niacin Dosing: Relationship to Benefits and Adverse Effect", Current Atherosclerosis Reports, 2000, 2, 64-71, (8 pages).
Ex. 2125 to Updated List of Patent Owner's Exhibits dated Jun. 7, 2016, IPR2015-01835, Teramoto T. et al., "Effect of large dose of niceritrol (Perycit) on hypercholesterolemia—by administering Gradually Increasing Doses, Hardening of the arteries", (1991), 199-208, (11 pages).
Ex. 2126 to Updated List of Patent Owner's Exhibits dated Jun. 7, 2016, IPR2015-01835, Reference 4 cited in JPA No. 2007-502093, vol. 40, 3389-3397. (10 pages).
Ex. 2127 to Updated List of Patent Owner's Exhibits dated Jun. 7, 2016, IPR2015-01835, Knopp R., "Treatment of Lipid Disorders", New England Journal of Medicine, Aug. 1999, vol. 341:498-511. (25 pages).
Ex. 2128 to Updated List of Patent Owner's Exhibits dated Jun. 7, 2016, IPR2015-01835, Bays, H. et al., "Pharmacotherapy for dyslipidaemia—current therapies and future agents", Expert Opin. Pharmacother. (2003) 4(11), 1901-38. (38 pages).

(56) References Cited

OTHER PUBLICATIONS

Ex. 2129 to Updated List of Patent Owner's Exhibits dated Jun. 7, 2016, IPR2015-01835, Bruckert, E., "New lipid-modifying therapies", Expert Opin. Invescig. Drugs (2003) 12(3): 325-335, (11 pages).
Ex. 2130 to Updated List of Patent Owner's Exhibits dated Jun. 7, 2016, IPR2015-01835, Kastelein, J., "What future for combination therapies?" Int. J. Clin. Pract. Suppl. Mar. 2003, (134), 45-50. (6 pages).
Ex. 2146 to Updated List of Patent Owner's Exhibits dated Jun. 7, 2016, IPR2015-01835, Microsomal Triglyceride Transfer Protein, 1-6. (6 pages).
Ex. 2147 to Updated List of Patent Owner's Exhibits dated Jun. 7, 2016, IPR2015-01835, Wetterau, J., et al., "Microsomal triglyceride transfer protein", Biochimica et Biophysica Acta 1345 (1997) 136-150. (15 pages).
Ex. 2148 to Updated List of Patent Owner's Exhibits dated Jun. 7, 2016, IPR2015-01835, Thomas, L., "Alleviation of MTP inhibitor-induced hepatic steatosis in hyperilpidemic fa/fa rats by fenofibrate", Department of Metabolic Diseases and Dept. of Chemical Research, Boehringer Ingelheim, 1 page.
Ex. 2149 to Updated List of Patent Owner's Exhibits dated Jun. 7, 2016, IPR2015-01835, Wierzbicki, A., "New lipid-lowering agents", Expert Opin. Emerging Drugs (2003) 8(2): 365-376. (16 pages).
Ex. 2150 to Updated List of Patent Owner's Exhibits dated Jun. 7, 2016, IPR2015-01835, Atzel, A., et al., "Mechanism of Microsomal Triglyceride Transfer Protein Catalyzed Lipid Transport", Biochemistry 1993, 32, 10444-10450. (7 pages).
Ex. 2151 to Updated List of Patent Owner's Exhibits dated Jun. 7, 2016, IPR2015-01835, Bakillah, A., et al., "Decreased Secretion of ApoB Follows Inhibition of ApoB- MTP Binding by a Novel Antagonist", Biochemistry 2000, 39, 4892-4899. (8 pages).
Ex. 2152 to Updated List of Patent Owner's Exhibits dated Jun. 7, 2016, IPR2015-01835, Jamil, H., et al., "An inhibitor of the microsomal triglyceride transfer protein inhibits apoB secretion from HepG2 cells", Proc. Natl. Acad. Sci. USA, vol. 93, 1996. 11991-11995. (5 pages).
Ex. 2153 to Updated List of Patent Owner's Exhibits dated Jun. 7, 2016, IPR2015-01835, Liao, W., et al., "Blocking microsomal triglyceride transfer protein interferes with apoB secretion without causing retention or stress in the ER", Journal of Lipid Research, vol. 44, 2003, 978-985. (8 pages).
Ex. 2174 to Updated List of Patent Owner's Exhibits dated Jun. 7, 2016, IPR2015-01835, Parsons, C.G., et al., "Memantine is a clinically well tolerated NMDA receptor antagonist—a review of preclinical data", Neuropharmacology 38 (1999) 735-767. (33 pages).
Ex. 2175 to Updated List of Patent Owner's Exhibits dated Jun. 7, 2016, IPR2015-01835, Catapano, A.L., "Ezetimibe: a selective inhibitor of cholesterol absorption", European Heart Journal Supplements (2001) 3 (Supplement E), E6-E10. (5 pages).
Ex. 2176 to Updated List of Patent Owner's Exhibits dated Jun. 7, 2016, IPR2015-01835. Capson, T., "Synthesis and Evaluation of Ammonium Analogs of Carbocationic Intermediates in Squalene Biosynthesis", Dissertation, Department of Med. Chem., The University of Utah, vol. 4803B of Dissertations Abstracts International, 1987, Abstract. (1 page).
Ex. 2177 to Updated List of Patent Owner's Exhibits dated Jun. 7, 2016, IPR2015-01835, Corey, E.J., et al. 'Application of Unreactive Analogs of Terpenoid Pyrophsphates to Studies of Multistep Biosynthesis, Demonstration That "Presqualene Pyrophosphate" is an Essential Intermediate on the Path to Squalene', Journal. of the American Chemical Society, 98:5, 1976, 1291-93. (3 pages).
Ex. 2178 to Updated List of Patent Owner's Exhibits dated Jun. 7, 2016, IPR2015-01835, De Montellano, P., et al., "Inhibition of Squalene Synthetase by Farnesyl Pyrophosphate Analogues", Journal of Medicinal Chemistry, 1977, vol. 20, 243-49. (7 pages).
Ex. 2179 to Updated List of Patent Owner's Exhibits dated Jun. 7, 2016, IPR2015-01835, Earl, J., et al., "Ezetimbe", Nature Reviews, vol. 2, 2003, 97. (1 page).
Ex. 2180 to Updated List of Patent Owner's Exhibits dated Jun. 7, 2016, IPR2015-01835, National Cholesterol Education Program, Adult Treatment Panel III Report, 2001, 373 pages.
Ex. 2181 to Updated List of Patent Owner's Exhibits dated Jun. 7, 2016, IPR2015-01835, Farrell, G., "Drugs and Steatohepatitis", Seminars in Liver Disease, vol. 22, No. 2, 2002, 185-194. (10 pages).
Ex. 2182 to Updated List of Patent Owner's Exhibits dated Jun. 7, 2016, IPR2015-01835, Gagne, C., et al., "Efficacy and Safety of Ezetimibe Coadministered With Atorvastatin or Simvastatin in Patients with Homozygous Familial Hypercholesterolemia", Circulation, 2002; 105: 2469-2475. (7 pages).
Ex. 2183 to Updated List of Patent Owner's Exhibits dated Jun. 7, 2016, IPR2015-01835, Kirkpatrick, P., et al., "Market Indicators", Nature, vol. 2, 2003, 98. (1 page).
Ex. 2184 to Updated List of Patent Owner's Exhibits dated Jun. 7, 2016, IPR2015-01835, McClard, R., "Novel Phosphonylphosphinyl Analogues of Biochemically Interesting Diphosphates, Syntheses and Properties of P—C—P—C Analogues of Isopentenyl Diphosphate and Dimethylally Diphosphate", J. Am. Chem. Soc., 1987, 109, 5544-5. (2 pages).
Ex. 2185 to Updated List of Patent Owner's Exhibits dated Jun. 7, 2016, IPR2015-01836, Ritter, T., et al., "Heterocyclic ring scaffolds as small-molecule cholesterol absorption inhibitors", Org. Biomol. Chem., 2005, 3, 3514-3523. (10 pages).
Ex. 2186 to Updated List of Patent Owner's Exhibits dated Jun. 7, 2016, IPR2015-01835, Sudhop, T., et al., "Cholesterol Absorption Inhibitors for the Treatment of Hypercholesterolaaemia", Drugs, 2002; 62(16), 2333-2347. (15 pages).
Ex. 2261 to Updated List of Patent Owner's Exhibits dated Jun. 7, 2016, IPR2015-01836, Hussain, M., et al., "Multiple functions of microsomal triglyceride transfer protein", Nutrition & Metabolism, 2012, 9: 14, 1-16. (16 pages).
Ex. 2262 to Updated List of Patent Owner's Exhibits dated Jun. 7, 2016, IPR2015-01835, Li, J., et al., "Discovery of potent and orally active MTP inhibitors as potential anti-obesity agents", Bioorganic & Medicinal Chemistry Letters 16 (2006) 3039-3042. (4 pages).
Ex. 2263 to Updated List of Patent Owner's Exhibits dated Jun. 7, 2016, IPR2015-01835, Looije, N. et al., "Disodium Ascorbyl Phytostanyl Phosphates reduces plasma cholesterol concentration, body weight and abdominal fat gain within a dietary-induced obese mouse model", J Pharm Pharmaceut Sci 8 (3): 400-408, 2005. (9 pages).
Ex. 2264 to Updated List of Patent Owner's Exhibits dated Jun. 7, 2016, IPR2015-01835, Aggarwal, D., et al., "JTT-130, a microsomal triglyceride transfer protein inhibitor lowers plasma triglycerides and LDL cholesterol concentrations without increasing hepatic triglycerides in guinea pigs", BMC Cardiovascular Disorders 2005, 5:30, 1-8. (8 pages).
Ex. 2265 to Updated List of Patent Owner's Exhibits dated Jun. 7, 2016, IPR2015-01835, Samaha, F., et al., "Inhibition of microsomal triglyceride transfer protein alone or with ezetimibe in patients with moderate hypercholesterolemia", Nature Clinical Practice, Cardiovascular Medicine, Aug. 2008, vol. 5 No. 8, 497-505. (9 pages).
Ex. 2300 to Updated List of Patent Owner's Exhibits dated Jun. 7, 2016, IPR2015-01835, "Aegerion Pharmaceuticals, Starting Juxtapid", (Accessed Jun. 7, 2016) http://juxtapid.com/starting-juxtapid. (6 pages).
Ex. 2301 to Updated List of Patent Owner's Exhibits dated Jun. 7, 2016, IPR2015-01835, Aegerion Pharmaceuticals, Dosing and Administration (Accessed Jun. 7, 2016) http://www.juxtapid.com/healthcare-professionals/dosing-and-administratio-n. (4 pages).
Ex. 2304: Signed Videotaped Deposition of S. David Kimball, Ph.D. (Jul. 11, 2016) dated Aug. 10, 2016, in IPR2015-01836 (197 Pages).
Ex. 2305: Supplemental Declaration of Thomas A. Baillie, Ph.D., D.S.C., dated Oct. 7, 2016, in IPR2015-01836 (46 Pages).
Ex. 2306: Deposition of Randall M. Zusman, M.D. (Oct. 4, 2016), dated Oct. 7, 2016, in IPR2015-01836 (58 Pages).
Ex. 2308: Patent Owner's Motion for Pro Hac Vice Admission of Kevin S. Prussia Under 37 C.F.R. sctn. 42.10(c) (CFAD v. Penn), dated Nov. 21, 2016, in IPR2015-01836 (4 Pages).
Ex. 2310: Deposition of Richard Gregg, M.D. (Jul. 26, 2016), dated Apr. 5, 2017, in IPR2015-01836 (59 Pages).

(56) References Cited

OTHER PUBLICATIONS

Expert Panel on Detection, Evaluation, and Treatment of High Blood Cholesterol in Adults, "National Cholesterol Education Program: Adult Treatment Panel III Report". Publication No. 01-3095, I-1-IX-11. 2001. Bethesda, MD, National Heart, Lung, and Blook Institute. Ref Type: Report, 373 pages.
Farrell, "Drugs and Steatohepatitis", Semin Liver Dis, 2002, 22(2): 185-94. (10 pages).
Final Rejection for U.S. Appl. No. 10/591,923, dated Jul. 26, 2010. (7 pages).
Final Rejection for U.S. Appl. No. 14/075,483, dated May 28, 2015. (8 pages).
Freidewald et al., "Estimation of the concentration of low density lipoproteincholesterol in plasma without the use of the preparative ultracentrifuge", Clin Chem. Jun. 1972; 18(6): 499-502. (4 pages).
Fukushima et al., "Phase II Clinical Trial: Administration of Novel Antiepileptic Agent, Zonisamide (ZNA), to Epileptic Children," Jap J Pediat, 1987, 40(12): 3389-97 with partial translation, (10 pages).
Funatsu et al., "Atorvastatin Increases Hepatic Fatty Acid Beta-Oxidation in Sucrose-Fed Rats: Comparison with an MTP Inhibitor", Eur. J. Pharm. 2002 455: 161-167. (9 pages).
Gagne et al., "Efficacy and Safety of Ezetimibe Coadministered With Atorvastatin or Simvastatin in Patients With Homozygous Familial Hypercholesterolemia", Circulation, May 28, 2002, 105(21): 2469-75. (7 pages).
Giammanco, A., et al., "Effectiveness and safety of lomitapide in a patient with familial chylomicronemia syndrome", Atherosclerosis, Elsevier, Amsterdam, NL, vol. 331, Aug. 1, 2021, (1 page).
Goldberg, Anne C., "Emerging low-densitylipoprotein therapies: Microsomaltriglyceride transfer protein inhibitors", Journal of Clinical Lipidology, vol. 7, No. 3, May 1, 2013, pp. S16-S20.
Gruetzmann, R., et al., "Implitapide (BAY 13-9952) Inhibits Secretion of ApoB-Associated Lipoproteins by Inhibition of the Microsomal Triglyceride Transfer Protein (MTP)", Eur Heart J 2000, Aug. 1, 2000, 21 (Abstract Suppl): 600 (Abstract# P3271). (1 page).
Guo, et al. Lipoprotein Lp(a) in homozygous familial hypercholesterolemia: density profile, particle heterogeneity and apolipoprotein(a) phenotype. Atherosclerosis. 1991; 31:69-83. (15 pages).
Heider et al., "Role of acyl CoA:cholesterol acyltransferase in cholesterol absorption and its inhibition by 57-118 in the rabbit", J Lipid Res. Sep. 1983; 24(9): 1127-34, (8 pages).
Hussain et al., "Multiple Functions of Microsomal Triglyceride Transfer Protein", Nutr Metab (London), Feb. 21, 2012, 9: 14-30. (16 pages).
International Preliminary Report on Patentability for International Application No. PCT/US2021/043667 dated Feb. 9, 2023, 8 pages.
International Preliminary Report on Patentability for International Application No. PCT/US2022/018672 dated Sep. 14, 2023, 9 pages.
International Search Report and Written Opinion for International Application No. PCT/US2021/043667, mailed Oct. 29, 2021, 13 pages.
International Search Report for Application No. PCT/US05/007435 completed Jun. 2, 2005 (Jun. 2, 2005) and dated Jul. 14, 2005 (Jul. 14, 2005), (3 pages).
International Search Report for Application No. PCT/US06/040637 completed Mar. 16, 2007 and dated Jun. 12, 2007 (Jun. 12, 2007) pp. 1-8. (9 pages).
International Search Report for Application No. PCT/US06/040639 completed Mar. 22, 2007 (Mar. 22, 2007) and dated Jun. 12, 2007 (Jun. 23, 2007) pp. 1-9. (9 pages).
International Search Report for Application No. PCT/US06/04064 dated May 23, 2007 (9 pages).
International Search Report for Application No. PCT/US06/040640 completed Mar. 13, 2007 and dated May 23, 2007, (6 pages).
International Search Report for Application No. PCT/US06/040953 completed Mar. 19, 2007 (Mar. 19, 2007) and dated Mar. 30, 2007 (Mar. 30, 2007), pp. 1-8. (8 pages).
International Search Report for Application No. PCT/US07/026300 dated Jun. 2, 2008 (6 pages).

Jamil, H., et al., "An Inhibitor of the Microsomal Triglyceride Transfer Protein Inhibits ApoB Secretion from HepG2 Cells", Proc Natl Acad Sci USA, Oct. 15, 1996, 93(21): 11991-5. (5 pages).
Kastelein, J., "What Future for Combination Therapies?", Int J Clin Pract Suppl 2003, Mar. 2003, 134: 45-50. (6 pages).
Kessler et al., "Fluorometric measurement of triglycerides", In: Skeggs LT, Jr, eds. Automation in Analytical Chemistry: Technicom Symposia. New York, NY: Madiad Inc; 1965: 341-344.
Kirkpatrick, P., "Fresh From the Pipeline, Market Indicators, Ezetimibe", Nat Rev Drug Discov, Feb. 2003, 2(2): 97-98. (1 page).
Knopp, R. H., "Drug Treatment of Lipid Disorders", N Engl J Med, Aug. 12, 1999, 341(7): 498-511. (25 pages).
Li, J., et al., "Discovery of Potent and Orally Active MTP Inhibitors as Potential Anti-Obesity Agents", Bioorg Med Chem Lett, Mar. 10, 2006, 16(11): 3039-42. (4 pages).
Liao, W., et al., "Blocking Microsomal Triglyceride Transfer Protein Interferes with ApoB Secretion Without Causing Retention or Stress in the ER", J Lipid Res. May 2003; 44(5): 978-85. Epub Feb. 16, 2003, (8 pages).
Liu, T., et al., "Allometry Is a Reasonable Choice in Pediatric Drug Development", J Clin Pharmacol, Apr. 2017; 57(4): 469-475. Epub Nov. 22, 2016, (12 pages).
"Lojuxta", European Medecines Agency, EPAR summary for the public, Sep. 3, 2013, 3 pages.
Lomitapide (Juxtapid) [Internet], Ottawa (ON): Canadian Agency for Drugs and Technologies in Health; Jul. 2015. CADTH Common Drug Reviews, 77 pages.
Looije Na et al., 'Disodium Ascorbyl Phytostanyl Phosphates (FM-VP4) Reduces Plasma Cholesterol Concentration, Body Weight and Abdominal Fat Gain Within a Dietary-Induced Obese Mouse Model,' J Pharm Pharm Sci, Aug. 24, 2005 (Aug. 24, 2005), 8(3): 400-8. (9 pages).
Mahzari, M., et al., "Homozygous Familial Hypercholesterolemia (HoFH) in Saudi Arabia and Two Cases of Lomitapide Use in a Real-World Setting", Adv Ther, May 2021; 38(5): 2159-2169. Epub Apr. 7, 2021. (11 pages).
McClard, R.W., and Fujita, T. S., "Novel Phosphonylphosphinyl (P—C—P—C-) Analogues of Biochemically Interesting Diphosphates. Synthesis and Properties of P—C—P—C-Analogues of Isopentenyl Diphosphate and Dimethylallyl Diphosphate", J Am Chem Soc, Sep. 1, 1987 (Sep. 1, 1987), 109(18): 5544-5 (2 pages).
Medical Research Laboratories International, "Implitapide in Patients with Homozygous Familial Hypercholesterolemia (HoFH) on Maximal Concurrent Lipid-Lowering Therapy", CTG Identifier #NCT00079846, Mar. 17, 2004, NIH (Pub), pp. 1-3.
Medical Research Laboratories International, "Implitapide in Patients with Hypertriglyceridemia (HTG) on Maximal, Concurrent Triglyceride-Lowering Therapy", ClinicalTrials.gov ID: NCT00080132, Study completion Apr. 2005, (7pages).
Non-final Rejection for U.S. Appl. No. 10/591,923, dated Oct. 21, 2009. (10 pages).
Non-final Rejection for U.S. Appl. No. 10/591,923, dated Sep. 23, 2010. (8 pages).
Non-final Rejection for U.S. Appl. No. 13/046,118, dated Oct. 2, 2012 (11 pages).
Non-final Rejection for U.S. Appl. No. 14/075,483, dated Oct. 9, 2014. (14 pages).
Non-final Rejection for U.S. Appl. No. 14/959,756, dated Mar. 2, 2016. (12 pages).
Non-final Rejection for U.S. Appl. No. 15/155,647, dated Feb. 8, 2017. (10 pages).
Non-final Rejection for U.S. Appl. No. 15/218,670, dated Feb. 8, 2017. (10 pages).
Non-final Rejection for U.S. Appl. No. 15/605,548, dated Sep. 5, 2017, 10 pages.
Notice of Deposition of Michael Mayersohn, Ph.D. (Paper No. 10), dated Apr. 25, 2016, in IPR2015-01835 (3 pages).
Notice of Deposition of Michael Mayersohn, Ph.D. (Paper No. 10), dated Apr. 25, 2016, in IPR2015-01836 (3 pages).
Notice of Deposition of Randall M. Zusman, M.D. (Paper No. 11), dated Apr. 25, 2016, in IPR2015-01835 (3 pages).
Notice of Deposition of Randall M. Zusman, M.D. (Paper No. 11), dated Apr. 25, 2016, in IPR2015-01836 (3 pages).

(56) References Cited

OTHER PUBLICATIONS

Notice of Opposition to European Patent No. EP1725234, dated Aug. 21, 2013. (19 pages).
Orgogozo J-M et al., "Efficacy and Safety of Memantine in Patients with Mild to Moderate Vascular Dementia. A Randomized, Placebo-Controlled Trial (MMM 300)", Stroke, Jul. 2002 (Jul. 2002), 33(7): 1834-9. (6 pages).
Paper 21: Notice of Deposition of S. David Kimball, dated Jul. 11, 2016, in IPR2015-01836 (3 Pages).
Paper 22: Order Conduct of the Proceeding 37 C.F.R. sctn. 42.5, dated Jul. 20, 2016, in IPR2015-01836 (7 Pages).
Paper 23: Notice of Deposition of Dr. Gregg, dated Jul. 11, 2016, in IPR2015-01836 (3 Pages).
Paper 24: Patent Owner's Corrected Motion to Amend Under 37 C.F.R. sctn. 42.121, dated Jul. 29, 2016, in IPR2015-01836 (39 Pages).
Paper 25: Patent Owner's Corrected Certificate of Service, dated Jul. 29, 2016, in IPR2015-01836 (21 Pages).
Paper 26: Updated List of Patent Owner's Exhibits, dated Aug. 10, 2016, in IPR2015-01836 (2 Pages).
Paper 27: Notice of Deposition of Thomas A. Baillie, dated Aug. 22, 2016, in IPR2015-01836 (3 Pages).
Paper 28: Notice of Deposition of Dr. Daniel J. Rader, dated Aug. 22, 2016, in IPR2015-01836 (3 Pages).
Paper 30: Petitioner Reply for Inter Partes Review of U.S. Pat. No. 7,932,268, (redacted), dated Sep. 7, 2016, in IPR2015-01836 (38 Pages).
Paper 33: Petitioner's Opposition to Patent Owner's Contingent Motion to Amend, dated Sep. 7, 2016, in IPR2015-01836 (39 Pages).
Paper 34: Patent Owner's Objections to Evidence Pursuant to 37 C.F.R. sctn. 42.64, dated Sep. 14, 2016, in IPR2015-01836 (6 Pages).
Paper 35: Notice of Deposition of Randall M. Zusman, M.D., dated Sep. 16, 2016, in IPR2015-01836 (3 Pages).
Paper 36: Patent Owner's Reply in Support of Motion to Amend Under 37 C.F.R. sctn. 42.121, dated Oct. 7, 2016, in IPR2015-01836 (16 Pages).
Paper 37: Updated List of Patent Owner's Exhibits, dated Oct. 7, 2016, in IPR2015-01836 (21 Pages).
Paper 38: Petitioner's Objections Under 37 C.F.R. sctn. 42.64 to Evidence Submitted by Patent Owners, dated Oct. 14, 2016, in IPR2015-01836 (5 Pages).
Paper 39: Notice of Deposition of Thomas A. Baillie (Oct. 24, 2016), dated Oct. 24, 2016, in IPR2015-01836 (3 Pages).
Paper 40: Patent Owner's Motion to Exclude Evidence, dated Oct. 28, 2016, in IPR2015-01836 (10 Pages).
Paper 41: Patent Owner's Observations on Cross-Examination of Petitioner's Reply Witness, dated Oct. 28, 2016, in IPR2015-01836 (5 Pages).
Paper 42: Patent Owner's Request for Oral Argument, dated Oct. 28, 2016, in IPR2015-01836 (3 Pages).
Paper 43: Petitioner's Observations on Cross-Examination of Dr. Thomas A. Baillie, dated Oct. 28, 2016, in IPR2015-01836 (14 Pages).
Paper 44: Petitioner's Request for Oral Argument, dated Oct. 28, 2016, in IPR2015-01836 (3 Pages).
Paper 45: Patent Owner's Response to Petitioner's Observations on Cross-Examination of Dr. Thomas A. Baillie, dated Nov. 10, 2016, in IPR2015-01836 (6 Pages).
Paper 46: Petitioners Opposition to Patent Owner's Motion to Exclude Evidence, dated Nov. 10, 2016, in IPR2015-01836 (6 Pages).
Paper 47: Petitioner's Response to Patent Owner's Observations on Cross-Examination of Petitioner's Reply Witness, dated Nov. 10, 2016, in IPR2015-01836 (4 Pages).
Paper 48: Patent Owner's Reply in Support of its Motion to Exclude Evidence, dated Nov. 18, 2016, in IPR2015-01836 (6 Pages).
Paper 49: POA for Patent Owner the Trustees of the University of Pennsylvania, dated Nov. 21, 2016, in IPR2015-01836 (3 Pages).
Paper 50: Patent Owner's Motion for Pro Hac Vice Admission of Kevin S. Prussia Under 37 C.F.R. sctn. 42.10(c), dated Nov. 21, 2016, in IPR2015-01836 (6 Pages).
Paper 51: Updated List of Patent Owner's Exhibits, dated Nov. 21, 2016, in IPR2015-01836 (21 Pages).
Paper 52: Order Trial Hearing 37 C.F.R. sctn. 42.70, dated Nov. 23, 2016, in IPR2015-01836 (5 Pages).
Paper 54: Order Patent Owner's Motions for Pro Hac Vice Admission of Kevin S. Prussia 37 C.F.R. sctn. 42.10, dated Nov. 28, 2016, in IPR2015-01836 (3 Pages).
Paper 55: Inter Partes Review Hearing—Dec. 1, 2016, dated Nov. 21, 2016, in IPR2015-01836 (174 Pages).
Paper 56: Record of Oral Hearing (Held: Dec. 1, 2017) dated Jan. 18, 2017, in IPR2015-01836 (81 Pages).
Paper 57: Order Granting Patent Owner's Motion to Seal 37 C.F.R. sctn. 42.14 and 42.54, dated Mar. 6, 2017, in IPR2015-01836 (6 Pages).
Paper 58: Final Written Decision 35 U.S.C. sctn. 318(a) and 37 C.F.R. 42.73, dated Mar. 6, 2017, in IPR2015-01836 (47 Pages).
Paper 59: Patent Owner's Motion to Seal, dated Apr. 5, 2017, in IPR2015-01836 (6 Pages).
Parsons, et al. Memantine is a clinically well tolerated N-methyl-D-aspartate (NMDA) receptor antagonist—a review of preclinical data. Neuropharmacology, 38: 735-767 (1999). (33 pages).
Patent Owner's Mandatory Notices Pursuant to 37 C.F.R. sctn.42. 8(a)(2) (Paper No. 5) filed in Inter Partes Review Case No. IPR2015-01835 for U.S. Pat. No. 8,618,135, dated Sep. 18, 2015 (5 pages).
Patent Owner's Mandatory Notices Pursuant to 37 C.F.R. sctn.42. 8(a)(2) (Paper No. 5) filed in Inter Partes Review Case No. IPR2015-01836 for U.S. Pat. No. 7,932,268, dated Sep. 18, 2015 (5 pages).
Patent Owner's Motion to Amend Under 37 C.F.R. sctn. 42.121 (Paper No. 18), dated Jun. 7, 2016, in IPR2015-01835 (42 pages).
Patent Owner's Motion to Amend Under 37 C.F.R. sctn. 42.121 (Paper No. 18), dated Jun. 7, 2016, in IPR2015-01836 (42 pages).
Patent Owner's Motion to Seal (Paper No. 19), dated Jun. 7, 2016, in IPR2015-01835 (6 pages).
Patent Owner's Motion to Seal (Paper No. 19), dated Jun. 7, 2016, in IPR2015-01836 (6 pages).
Patent Owner's Objections to Evidence Pursuant to 37 C.F.R. sctn.42.64 (Paper No. 9) filed in Inter Partes Review Case No. IPR2015-01835 for U.S. Pat. No. 8,618,135, dated Mar. 21, 2016 (8 pages).
Patent Owner's Objections to Evidence Pursuant to 37 C.F.R. sctn.42.64 (Paper No. 9) filed in Inter Partes Review Case No. IPR2015-01836 for U.S. Pat. No. 7,932,268, dated Mar. 21, 2016 (8 pages).
Patent Owner Preliminary Response filed in Inter Partes Review Case No. IPR2015-01835 for U.S. Pat. No. 8,618,135, dated Dec. 8, 2015, 69 pages.
Patent Owner Preliminary Response filed in Inter Partes Review Case No. IPR2015-01836 for U.S. Pat. No. 7,932,268, dated Dec. 8, 2015, 66 pages.
Patent Owner's Response (Paper No. 16), dated Jun. 7, 2016, in IPR2015-01835 (74 pages).
Patent Owner's Response (Paper No. 16), dated Jun. 7, 2016, in IPR2015-01836 (74 pages).
Patentee's Observations in reply to the Notice of Opposition filed in European Patent No. 1725234, filed with the European Patent Office dated Aug. 27, 2014, 6 pages.
Petition for Inter Partes Review of U.S. Pat. No. 7,932,268 filed Aug. 28, 2015, by the Coalition for Affordable Drugs (ADROCA) LLC ("the ADROCA '268 IPR") (IPR2015-01836). (74 pages).
Petition for Inter Partes Review of U.S. Pat. No. 8,618, 135 filed Aug. 28, 2015, by the Coalition for Affordable Drugs (ADROCA) LLC ("the ADROCA '135 IPR") (IPR2015-01835). (75 pages).
Power of Attorney for Coalition for Affordable Drugs VIII LLC (Paper No. 2) filed in Inter Partes Review Case No. IPR2015-01835 for U.S. Pat. No. 8,618,135, dated Aug. 27, 2015 (2 pages).
Power of Attorney for Coalition for Affordable Drugs VIII LLC (Paper No. 2) filed in Inter Partes Review Case No. IPR2015-01836 for U.S. Pat. No. 7,932,268, dated Aug. 27, 2015 (2 pages).

(56) References Cited

OTHER PUBLICATIONS

Power of Attorney for Patent Owner the Trustees of the University of Pennsylvania (Paper No. 4) filed in Inter Partes Review Case No. IPR2015-01835 for U.S. Pat. No. 8,618,135, dated Sep. 17, 2015 (3 pages).
Power of Attorney for Patent Owner the Trustees of the University of Pennsylvania (Paper No. 4) filed in Inter Partes Review Case No. IPR2015-01836 for U.S. Pat. No. 7,932,268, dated Sep. 17, 2015 (3 pages).
PTAB, Decision for the Institution of Inter Partes Review, pursuant to 37 C.F.R. sctn. 42.108, of U.S. Pat. No. 7,932,268, (Paper No. 7) entered into the record on Mar. 7, 2016, Case No. IPR2015-01836 (35 pages).
PTAB, Decision for the Institution of Inter Partes Review, pursuant to 37 C.F.R. sctn. 42.108, of U.S. Pat. No. 8,618,135 B2, (Paper No. 7), entered into the record on Mar. 7, 2016, Case No. IPR2015-01835 (35 pages).
PTAB, Notice of Filing Date Accorded to Petition and Time for Filing Patent Owner Preliminary Response, (Paper No. 3), entered into the record on Sep. 8, 2015, in Inter Partes Review Case No. IPR2015-01835, directed to U.S. Pat. No. 8,618,135 B2 (3 pages).
PTAB, Notice of Filing Date Accorded to Petition and Time for Filing Patent Owner Preliminary Response, (Paper No. 3), entered into the record on Sep. 8, 2015, in Inter Partes Review Case No. IPR2015-01836, directed to U.S. Pat. No. 7,932,268 (3 pages).
PTAB Order [on] Motions for Pro Hac Vice Admission of Nicholas K. Mitrokostas [under] 37 C.F.R. sctn.42.10 (Paper No. 14), entered May 17, 2016, in Consolidated Proceedings IPR2015-01835 and IPR2015-01836 (3 pages).
PTAB Order re: Conduct of the Proceedings under 37 C.F.R. sctn.42.5 (Paper No. 15), entered Jun. 3, 2016, in Consolidated Proceedings IPR2015-01835 and IPR2015-01836 (3 pages).
PTAB, Scheduling Order for Inter Partes Review Case Nos. IPR2015-01835 and IPR2015-01836 for U.S. Pat. No. 8,618,135 B2 and U.S. Pat. No. 7,932,268 B2, respectively, (Paper No. 8), entered into the record on Mar. 7, 2016 (9 pages).
Ritter, T., et al., "Heterocyclic Ring Scaffolds as Small-Molecule Cholesterol Absorption Inhibitors", Org Biomol Chem. Oct. 7, 2005;3(19): 3514-23. Epub Aug. 24, 2005.
Robl, J. A., et al., "A Novel Series of Highly Potent Benzimidazole-Based Microsomal Triglyceride Transfer Protein Inhibitors", J Med Chem, Feb. 21, 2001, 44(6): 851-6. (6 pages).
Samaha, et al., "Inhibition of Microsomal Triglyceride Transfer Protein Alone or With Ezetimibe in Patients With Moderate Hypercholesterolemia", Nat Clin Pract Cardiovasc Med. Aug. 2008; 5(8): 497-505. Epub May 27, 2008. (9 pages).
Shiomi, M. and Ito, T., "Mtp Inhibitor Decreases Plasma Cholesterol Levels in LDL Receptor-Deficient WHHL Rabbits by Lowering the VLDL Secretion", Eur J Pharmacol. Nov. 9, 2001; 431(1): 127-31 (5 pages).
So, Andrew, et al., "Microsomal Triglyceride Transfer Protein," Wikipedia Page Microsomal triglyceride transfer protein, Aug. 20, 2013, Wikimedia Foundation, San Francisco, CA, USA (Pub), pp. 1-6, http://en.wikipedia.org/wiki/Microsomal.triglyceride_transfer_protein.
Sorbera, L. A., et al., "Implitapide. Hypolipidemic Treatment of Atherosclerosis MTP Inhibitor ApoB Secretion Inhibitor", Drugs of the Future, Nov. 2000, 25(11): 1138-44. (7 pages).
Stipulated Motion for Entry of Protective Order (Paper No. 17), dated Jun. 7, 2016, in IPR2015-01836 (9 pages).
Stipulated Motion tor Entry of Protective Order (Paper No. 17), dated Jun. 7, 2016, in IPR2015-01835 (9 pages).
Sudhop and Bergmann, "Cholesterol Absorption Inhibitors for the Treatment of Hypercholesterolaemia", Drugs. 2002; 62(16): 2333-47. (15 pages).
Summons to Oral Proceedings in European Patent No. 1 725 234, dated Nov. 3, 2014, 13 pages.
Teramoto, T, et al., "Effect of Large Dose of Niceritrol (Perycit®) on Hypercholesterolemia—by Administering Gradually Increasing Doses," Jap Atherosclerosis Soc J: Atherosclerosis, 1991, 19(2-3): 199-208, with English abstract (10 pages).
Thomas et al., "Alleviation of MTP Inhibitor-Induced Hepatic Steatosis in Hyperlipidemic fa/fa Rats by Fenofibrate", Dept. of Metabolic Diseases and Dept. of Chemical Research, Boehringer Ingelheim Pharma GmbH & Co. KG, retrieved 2005, (1 page).
Underberg, J.A., et al., "Long-term safety and Efficacy of Lomitapide in Patients with Homozygous Familial Hypercholesterolemia: Five-year data from the Lomitapide Observational Worldwide Evaluation Registry (LOWER)," Journal of clinical lipidology, Aug. 19, 2020, vol. 14(6), pp. 807-817. (11 pages).
Updated List of Patent Owner's Exhibits (Paper No. 13), dated May 5, 2016, in IPR2015-01835 (4 pages).
Updated List of Patent Owner's Exhibits (Paper No. 13), dated May 5, 2016, in IPR2015-01836 (4 pages).
Updated List of Patent Owner's Exhibits (Paper No. 20), dated Jun. 7, 2016, in IPR2015-01835 (21 pages).
Updated List of Patent Owner's Exhibits (Paper No. 20), dated Jun. 7, 2016, in IPR2015-01836 (21 pages).
Van Dam, M. J., et al., "Efficacy and Safety of Impiltapide (Bay 13 9952), A Microsomal Triglyceride Transfer Protein Inhibitor, in Patients with Primary Hypercholesterolemia," Chapter 2, Dissertation, (2001). (13 pages).
Visoli, "Microsomal triglyceride transfer protein inhibitors," Current Opinion in Cardiovascular, Pulmonary & Renal Investigational Drugs (2000), vol. 2, No. 3, pp. 292-293. (2 pages).
Wetterau, J. R., et al., "An MTP Inhibitor that Normalizes Atherogenic Lipoprotein Levels in WHHL Rabbits", Science, Oct. 23, 1998, 282(5389): 751-4. (5 pages).
Wetterau, J. R. et al., "Microsomal Triglyceride Transfer Protein", Biochim Biophys Acta, Apr. 1, 1997, 1345(2): 136-50. (15 pages).
Wierzbicki, "New Lipid-Lowering Agents", Expert Opin Emerging Drugs, Nov. 2003, 8(2): 365-76. (16 pages).
Williams and Best, "Novel Microsomal Triglyceride Transfer Protein Inhibitors", Expert Opin Ther Patents, Apr. 2003, 13(4): 479-88. (10 pages).
Zaiss, S. and Sander, E., "Bay 13-9952 (Implitapide), An Inhibitor of the Microsomal Triglyceride Transfer Protein (MTP), Inhibits Atherosclerosis and Prolongs Lifetime in Apo-E Knockout Mice", Eur Heart J 2000, Aug. 1, 2000, 21 (Abstract Suppl): 16 (Abstract #194) (1 page).
Cuchel, M., et al., "2023 Update on European Atherosclerosis Society Consensus Statement on Homozygous Familial Hypercholesterolaemia: new treatments and clinical guidance." Eur Heart J. Jul. 1, 2023; 44(25): 2277-2291. doi: 10.1093/eurheartj/ehad197.
Klaus, G., et al., "Multimodal lipid-lowering treatment in pediatric patients with homozygous familial hypercholesterolemia-target attainment requires further increase of intensity." Pediatr Nephrol. Jul. 2018; 33(7): 1199-1208. doi: 10.1007/s00467-018- 3906-6. Epub Mar. 3, 2018.
Luirink, I., et al., "Efficacy and safety of lipoprotein apheresis in children with homozygous familial hypercholesterolemia: A systematic review." J Clin Lipidol. Jan.-Feb. 2019; 13(1): 31-39. doi: 10.1016/j.jacl.2018.10.011. Epub Nov. 3, 2018.
Mcerlean, S., et al., "Familial hypercholesterolaemia." BMJ. Jul. 10, 2023:382:e073280. doi: 10.1136/bmj-2022-073280. Correction included. 8 pages.
Thompson, G.R. et al., "Survival in homozygous familial hypercholesterolaemia is determined by the on-treatment level of serum cholesterol." Eur Heart J. Apr. 7, 2018; 39(14): 1162-1168. doi: 10.1093/eurheartj/ehx317.
Bai, J. et al., "Lomitapide Mesylate," (Luo Mei Ta Pai Jia Huang Suan Yan), Chinese Journal of Medicinal Chemistry, Jun. 20, 2013, vol. 23, No. 03, pp. 250, abstract; Chinese with machine translation, 2 pages.
Chekalin, A.F., et al., "Peculiarities of age-related pharmacokinetics in children." Pediatry, 2005, N3, pp. 63-66. Article in Russian, [Found 28.10.2024], online at https://pediatriajournal.ru/files/upload/mags/268/2005_3_1363.pdf, 6 pageseree with concise explanation in English.

(56) References Cited

OTHER PUBLICATIONS

Office Action and Search report for Russian Application No. 2023100558/04 mailed May 12, 2025, with English translation, 24 pages.

Chacra et al., "Case report: The efficacy and safety of lomitapide in a homozygous familial hypercholesterolemic child." J Clin Lipidol. May 2019-Jun. 13(3): 397-401. doi: 10.1016/j.jacl.2019.03.001. Epub Mar. 11, 2019.

European Medicines Agency, "ICH E11(R1) guideline on clinical investigation of medicinal products in the pediatric population." Committee for Human Medicinal Products, European Medicines Agency, Sep. 1, 2017, Sections 4 and 6.2, 12 printed pages.

JUXTAPID (lomitapide) capsules, labeling information, revised Dec. 2019, retrieved Sep. 15, 2025, 33 pages.

* cited by examiner

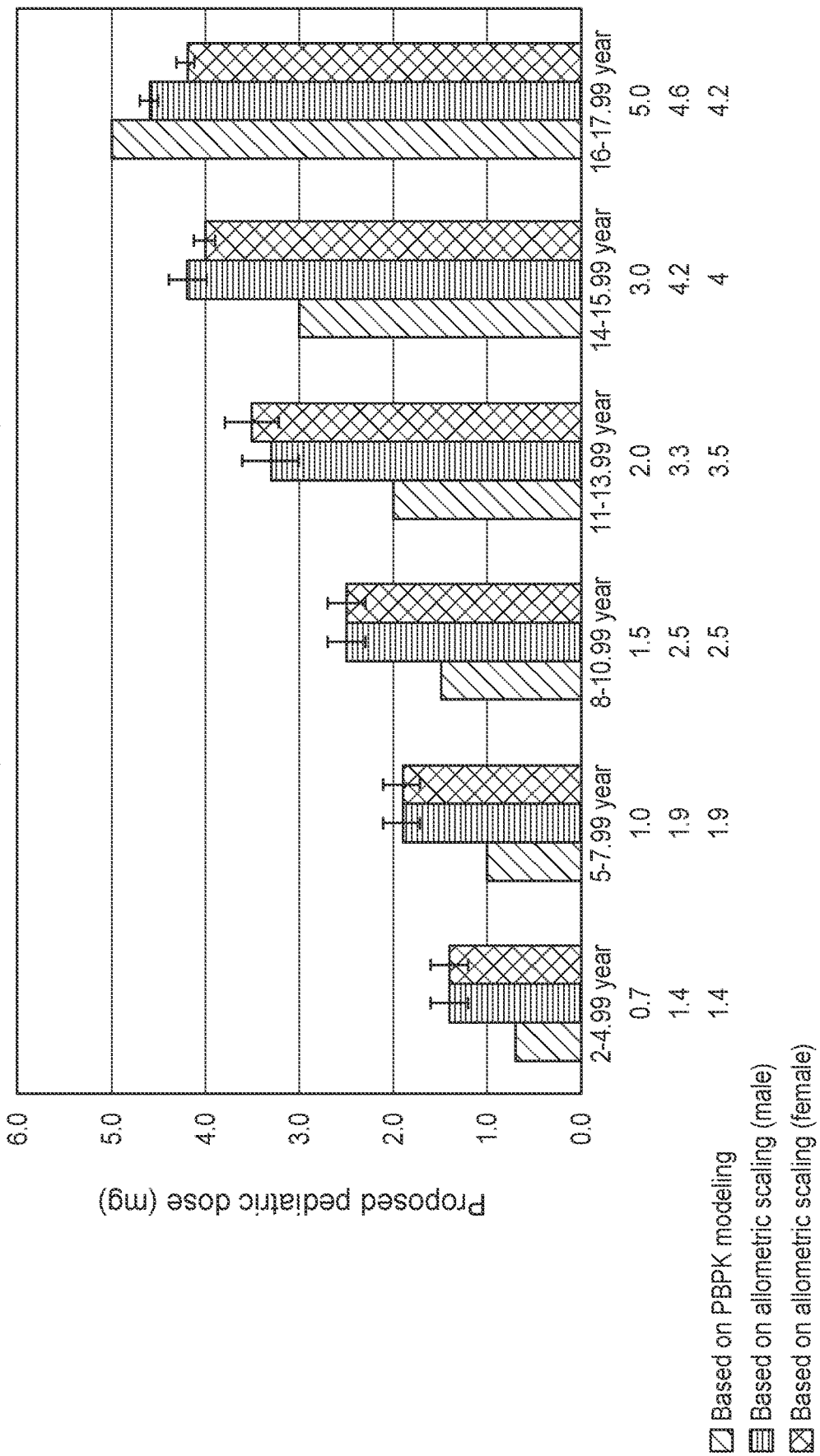

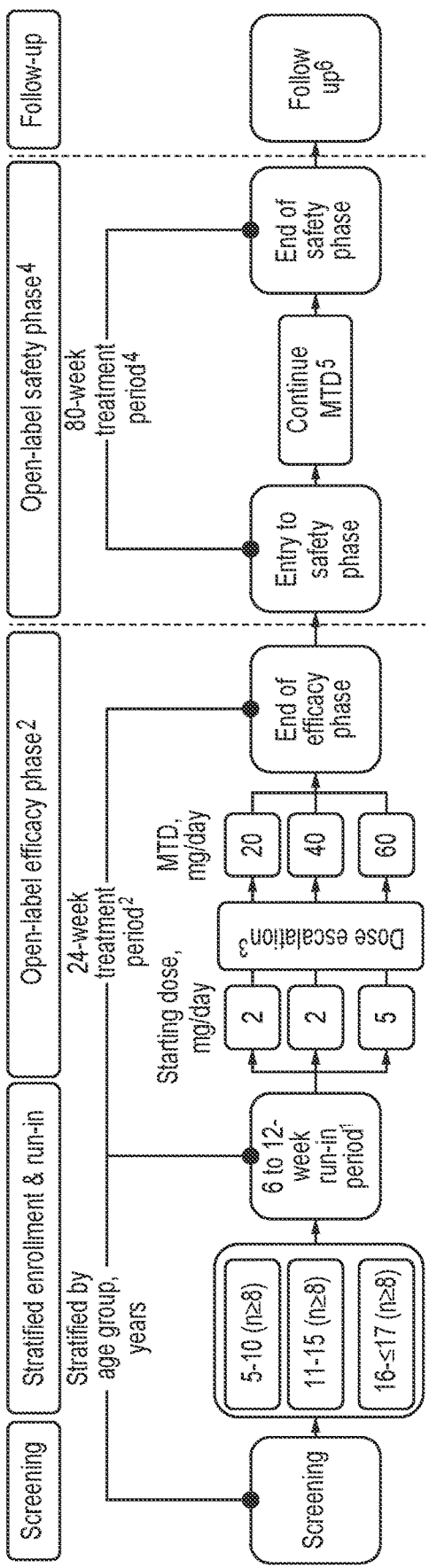

FIG. 2

AEs = adverse events; ALA = alpha-linoleic acid; DHA = docosahexaenoic acid; EFA = essential fatty acids; EPA = eicosapentaenoic acid; LA = lipoprotein apheresis; LDL-C = low-density lipoprotein cholesterol; LLT = lipid-lowering therapy; MTD = maximum tolerated dose 1. Stabilise current LLT (including LA, when applicable), establish diet <20% energy from fat or <30 g fat, whichever is the lesser amount, dietary supplementation from Week-2 (daily 200 IU [5 to 8 years of age] 400 IU [≥9 years of age] vitamin E and EFA supplement [approx. 200 mg linoleic acid, 210 mg ALA, 110 mg EPA, and 80 mg DHA])
2. During the 24-week efficacy phase, patients will be required to remain on the stable LLT regimen (including LA, when applicable) established during the 6-week run-in period
3. Based on safety, tolerability and efficacy parameters
4. Adjustments to background LLT (including LA, when applicable) will be allowed at the discretion of the investigator
5. Dose adjustment rules apply
6. Eligible patients who complete the study per protocol may choose to enter the long-term extension of this study, pending approval by appropriate ethics committees and regulatory authorities; for patients who opt not to participate in the long-term extension of this study or who are ineligible, there will be a 4-week Follow-up period during which study medication is discontinued and patients will remain on concomitant LLT (including LA, when applicable).

LOMITAPIDE FOR USE IN METHODS OF TREATING HYPERLIPIDEMIA AND HYPERCHOLESTEROLEMIA IN PEDIATRIC PATIENTS

CROSS-REFERENCE TO RELATED APPLICATIONS

This application is a continuation of U.S. application Ser. No. 18/018,031, filed Jan. 25, 2023, which is a U.S. National Stage Application under 35 U.S.C. § 371 of International Application No. PCT/US2021/043667, filed Jul. 29, 2021, which claims the benefit of priority to U.S Application Serial No. 63/058,211, filed Jul. 29, 2020, the contents of which is hereby incorporated by reference in its entirety for all purposes.

BACKGROUND

Homozygous familial hypercholesterolaemia (HoFH) is a rare and life-threatening inherited disorder of lipid metabolism with an estimated prevalence of 1 per 160,000 to 300,000 in the European population. The Consensus Panel on Familial Hypercholesterolaemia (FH) of the European Atherosclerosis Society (EAS) recommends the following criteria for the diagnosis of HoFH:
  i) genetic confirmation of 2 mutant alleles at the LDL receptor (LDLR), apolipoprotein B (apo B), proprotein convertase subtilisin/kexin type 9 (PCSK9), or LDL-receptor adapter protein 1 (LDLRAP1) gene locus or
  ii) an untreated low-density lipoprotein cholesterol (LDL-C) >500 mg/dL (13 mmol/L) and treated LDL-C ≥300 mg/dL (8 mmol/L), respectively together with either cutaneous or tendon xanthomas before the age of 10 years or untreated LDL-C levels consistent with heterozygous FH in both parents.

Significantly elevated LDL-C levels lead to premature, severe, and progressive atherosclerosis and development of early cardiovascular disease (CVD). The average age of death is 18 years if untreated and effective lipid-lowering therapy (LLT) greatly improves survival in HoFH. Based on the evidence that treatment can delay the onset of CVD, primary prevention is suggested to start as early as possible and mainly consists of lowering LDL-C levels to <135 mg/dL (<3.5 mmol/L) in pediatric HoFH patients and to <100 mg/dL (<2.5 mmol/L) in adults. Secondary prevention comprises a decrease of LDL-C levels to <70 mg/dL (<1.8 mmol/L) in adults with CVD as recommended by the EAS.

A number of treatments are currently available for lowering serum cholesterol and triglycerides. However, each has its own drawbacks and limitations in terms of efficacy, side-effects and qualifying patient population.

Thus, there is a need for safe, early and effective treatment of pediatric patients with HoFH.

BRIEF DESCRIPTION OF THE DRAWINGS

FIG. 1 shows the mean lomitapide pediatric starting dose (mg) based on PBPK modeling and allometric scaling.

FIG. 2 shows the design of the clinical study in Example 2.

SUMMARY

In embodiments, the present disclosure provides, a method of safely administering lomitapide, or a pharmaceutically acceptable salt thereof, to a pediatric patient comprising:
  (a) administering a first daily dose of about 0.5 mg to about 2.5 mg of lomitapide, or a pharmaceutically acceptable salt thereof to a patient aged 5 to 15 years; and
  (b) administering a first daily dose of about 2.5 mg to about 7.5 mg of lomitapide, or a pharmaceutically acceptable salt thereof to a patient aged 16 to 17 years, wherein the first daily dose is administered to the patient for about 1 to 4 weeks.

In embodiments, the present disclosure provides a method of treating hyperlipidemia or hypercholesterolemia in a pediatric patient, comprising:
  (a) administering a first daily dose of about 0.5 mg to about 2.5 mg of lomitapide, or a pharmaceutically acceptable salt thereof to a patient's age is 5 to 15 years;
  (b) administering a first daily dose of about 2.5 mg to about 7.5 mg of lomitapide, or a pharmaceutically acceptable salt thereof to a patient's age is 16 to 17 years,
wherein the first daily dose is administered to the patient for about 1 to 4 weeks.

In embodiments, provided herein is a method of treating hyperlipidemia or hypercholesterolemia, comprising:
  administering a first daily dose of about 0.5 mg to about 2.5 mg of lomitapide, or a pharmaceutically acceptable salt thereof to a pediatric patient age 5 to 10 years, wherein the first daily dose is administered to the patient for about 1 to 4 weeks.

In embodiments, provided herein is a method of treating hyperlipidemia or hypercholesterolemia, comprising:
  administering a first daily dose of about 0.5 mg to about 2.5 mg of lomitapide, or a pharmaceutically acceptable salt thereof to a pediatric patient age 11 to 15 years, wherein the first daily dose is administered to the patient for about 1 to 4 weeks.

In embodiments, the present disclosure provides a method of treating hyperlipidemia or hypercholesterolemia, comprising:
  administering a first daily dose of about 2.5 mg to about 7.5 mg of lomitapide, or a pharmaceutically acceptable salt thereof to a pediatric patient age 16 to 17 years, wherein the first daily dose is administered to the patient for about 1 to 4 weeks.

Definitions

The term "about" when immediately preceding a numerical value means a range (e.g., plus or minus 10% of that value). For example, "about 50" can mean 45 to 55, "about 25,000" can mean 22,500 to 27,500, etc., unless the context of the disclosure indicates otherwise, or is inconsistent with such an interpretation. For example in a list of numerical values such as "about 49, about 50, about 55, . . . ", "about 50" means a range extending to less than half the interval(s) between the preceding and subsequent values, e.g., more than 49.5 to less than 50.5. Furthermore, the phrases "less than about" a value or "greater than about" a value should be understood in view of the definition of the term "about" provided herein. Similarly, the term "about" when preceding a series of numerical values or a range of values (e.g., "about 10, 20, 30" or "about 10-30") refers, respectively to all values in the series, or the endpoints of the range.

Throughout this disclosure, various patents, patent applications and publications are referenced. The disclosures of these patents, patent applications and publications in their entireties are incorporated into this disclosure by reference for all purposes in order to more fully describe the state of the art as known to those skilled therein as of the date of this disclosure. This disclosure will govern in the instance that there is any inconsistency between the patents, patent applications and publications cited and this disclosure.

For convenience, certain terms employed in the specification, examples and claims are collected here. Unless defined otherwise, all technical and scientific terms used in this disclosure have the same meanings as commonly understood by one of ordinary skill in the art to which this disclosure belongs.

The terms "administer," "administering" or "administration" as used herein refer to either directly administering a compound or pharmaceutically acceptable salt or ester of the compound or a composition comprising the compound or pharmaceutically acceptable salt or ester of the compound to a patient.

The terms "effective amount" and "therapeutically effective amount" are used interchangeably in this disclosure and refer to an amount of a compound, or a salt, solvate or ester thereof, that, when administered to a patient, is capable of performing the intended result. For example, an effective amount of lomitapide is that amount which is required to reduce at least one symptom of HoFH in a patient, e.g. the amount required to reduce the patient's low-density lipoprotein cholesterol (LDL-C). The actual amount which comprises the "effective amount" or "therapeutically effective amount" will vary depending on a number of conditions including, but not limited to, the severity of the disorder, the size and health of the patient, and the route of administration. A skilled medical practitioner can readily determine the appropriate amount using methods known in the medical arts.

The phrase "pediatric patient" as used herein refers to a patient less than 18 years of age.

The phrase "pharmaceutically acceptable" as used herein refers to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The term "salts" as used herein embraces pharmaceutically acceptable salts commonly used to form alkali metal salts of free acids and to form addition salts of free bases. The nature of the salt is not critical, provided that it is pharmaceutically acceptable. The term "salts" also includes solvates of addition salts, such as hydrates, as well as polymorphs of addition salts. Suitable pharmaceutically acceptable acid addition salts can be prepared from an inorganic acid or from an organic acid. Examples of such inorganic acids are hydrochloric, hydrobromic, hydroiodic, nitric, carbonic, sulfuric, and phosphoric acid. Appropriate organic acids can be selected from aliphatic, cycloaliphatic, aromatic, arylaliphatic, and heterocyclyl containing carboxylic acids and sulfonic acids, for example formic, acetic, propionic, succinic, glycolic, gluconic, lactic, malic, tartaric, citric, ascorbic, glucuronic, maleic, fumaric, pyruvic, aspartic, glutamic, benzoic, anthranilic, mesylic, stearic, salicylic, p-hydroxybenzoic, phenylacetic, mandelic, embonic (pamoic), methanesulfonic, ethanesulfonic, benzenesulfonic, pantothenic, toluenesulfonic, 2-hydroxyethanesulfonic, sulfanilic, cyclohexylaminosulfonic, algenic, 3-hydroxybutyric, galactaric and galacturonic acid.

The term "treating" as used herein with regard to a patient, refers to improving at least one symptom of the patient's disorder. Treating can be improving, or at least partially ameliorating a disorder.

The term "therapeutic effect" as used herein refers to a desired or beneficial effect provided by the method and/or the composition. For example, the method for treating HoFH provides a therapeutic effect when the method reduces at least one symptom of HoFH, e.g., reduce low-density lipoprotein cholesterol (LDL-C), in a patient.

DETAILED DESCRIPTION

Lomitapide

Lomitapide is a first in class oral, selective inhibitor of microsomal transfer protein (MTP), an intracellular lipid-transfer protein that is found in the lumen of the endoplasmic reticulum and is responsible for binding and shuttling individual lipid molecules between membranes. MTP plays a key role in the assembly of apo B containing lipoproteins in the liver and intestines. Inhibition of MTP reduces lipoprotein secretion and circulating concentrations of lipoprotein-borne lipids including cholesterol and triglycerides.

The chemical name of lomitapide is N-(2,2,2-trifluoroethyl)-9-[4-[4-[[[4'(trifluoromethyl)[1,1'-biphenyl]-2-yl]carbonyl]amino]-1-piperidinyl]butyl]-9H-fluorene-9-carboxamide. Its structural formula is:

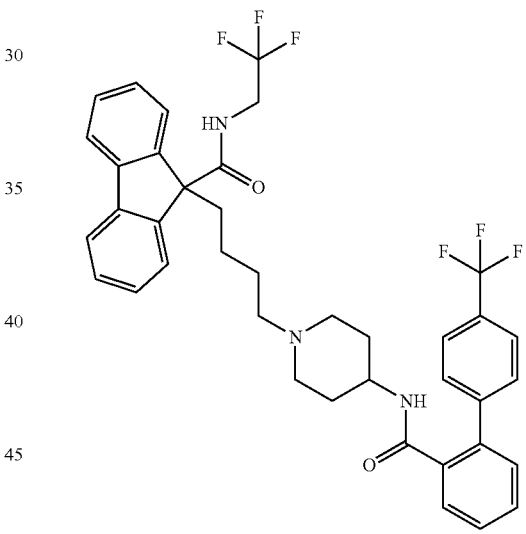

Lomitapide and other inhibitors of MTP-mediated neutral lipid transfer activity are described, for example, in U.S. Pat. Nos. 5,789,197, 5,883,109, 6,066,653, and 6,492,365, each of which is incorporated herein by reference in its entirety. MTP inhibitors are described throughout U.S. Pat. No. 6,066,653, in particular in columns 3-28. Lomitapide and methods for its use are described, for example, in U.S. Pat. Nos. 7,932,268; 8,618,135; 9,265,758; 9,364,470; 9,433,617; 9,861,622, 10,016,404, and 10,555,938 each of which is incorporated by reference herein in its entirety. See also U.S. Pat. No. 10,213,419 the entirety of which is incorporated herein by reference.

The European Commission (EC) granted authorization for lomitapide under the trade name 'Lojuxta®' in July 2013. Lomitapide is a "lipid modifying agent" according to the Anatomical Therapeutic Chemical (ATC) Classification System (ATC code C10AX12). It is indicated as an adjunct to a low-fat diet and other lipid-lowering medicinal products with or without LA in adult patients with HoFH. Genetic confirmation of HoFH should be obtained whenever possible. Other forms of primary hyperlipoproteinaemia and secondary causes of hypercholesterolaemia (e.g., nephrotic syndrome, hypothyroidism) must be excluded.

However, Lojuxta is not approved in pediatric patients (i.e., in patients less than 18 years of age) because the safety and efficacy of lomitapide in this sensitive population has not been established.

In formulating the compositions, lomitapide or a pharmaceutically acceptable salt thereof, in the amounts described herein, may be compounded according to accepted pharmaceutical practice with a physiologically acceptable vehicle, carrier, excipient, binder, preservative, stabilizer, flavor, etc., in the particular type of unit dosage form. Such dosage forms can be administered to the patient on a regimen of one to four doses per day.

In one aspect, the disclosure provides tablets containing a lomitapide composition as described herein. A tablet may be made by compression or molding, optionally with one or more accessory ingredients. Compressed tablets may be prepared using binder (for example, gelatin, microcrystalline cellulose, or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the subject composition moistened with an inert liquid diluent. Tablets, and other solid dosage forms, such as dragees, capsules, pills and granules, may optionally be scored or prepared with coatings and shells, such as enteric coatings and other coatings well known in the pharmaceutical-formulating art. The disclosed excipients may serve more than one function. For example, fillers or binders may also be disintegrants, glidants, anti-adherents, lubricants, sweeteners and the like Liquid formulations can also be prepared by dissolving or suspending one or the combination of active substances in a conventional liquid vehicle acceptable for pharmaceutical administration so as to provide the desired dosage in one to four teaspoonsfuls.

Dosage units including tablets, capsules and caplets, of various sizes can be prepared, e.g., of about 2 to 10000 mg in total weight, containing one or both of the active substances in the ranges described above, with the remainder being a physiologically acceptable carrier of other materials according to accepted pharmaceutical practice. These tablets can, of course, be scored to provide for fractional doses. Gelatin capsules can be similarly formulated. For example, in some embodiments a scored tablet may provide the dosage unit. Under the direction of a physician or other medical professional, the subject may be directed to take one portion of the dosage unit, wherein the one portion will provide the desired dosage level for given interval. At the following interval, the patient may be instructed to take two or more portions of the dosage unit wherein the two or more portions will provide the desired dosage level for that interval.

Formulations of lomitapide are commercially available, for example, as Juxtapid capsules. Each Juxtapid capsule contains lomitapide mesylate equivalent to 5, 10, 20, or 30 mg lomitapide free base and the following inactive ingredients: pregelatinized starch, sodium starch glycolate, microcrystalline cellulose, lactose monohydrate, silicon dioxide and magnesium stearate. The capsule shells of all strengths contain gelatin and titanium dioxide; the 5 mg, 10 mg and 30 mg capsules also contain red iron oxide; and the 30 mg capsules also contain yellow iron oxide. The imprinting ink contains shellac, black iron oxide, and propylene glycol. However, the scope of the present disclosure is not limited to dosage strengths of Juxtapid presently available commercially, and includes capsules containing lomitapide mesylate (or other pharmaceutically acceptable salts of lomitapide) equivalent to 5, 10, 20, 30, 40, or 60 mg lomitapide free base.

Methods of the Present Disclosure

The present disclosure provides methods of safely administering lomitapide to pediatric HoFH patients. It will be understood that in embodiments of the methods provided herein, the patient is a human.

The disclosure provides methods for treating hyperlipidemia or hypercholesterolemia (e.g., Homozygous Familial Hypercholesterolaemia (HoFH)) by administering an effective and tolerable amount of lomitapide or a pharmaceutically acceptable salt thereof, to a pediatric patient in need thereof. An effective amount is an amount sufficient significantly reduce hyperlipidemia or hypercholesterolemia (e.g., HoFH) symptoms or to alleviate those symptoms. Formulations employed in the present methods can incorporate lomitapide or a pharmaceutically acceptable salt thereof into a formulation such that the formulation provides therapeutically effective blood plasma levels of lomitapide or a pharmaceutically acceptable salt thereof for the treatment of hyperlipidemia or hypercholesterolemia (e.g., HoFH).

In some embodiments, a therapeutically effective dose is achieved by starting the patient on an initial daily dose and titrating to an efficacious and tolerated dose by gradually modifying (e.g., increasing or decreasing) the daily administered amount of lomitapide or a pharmaceutically acceptable salt thereof until a dose that is effective and tolerated is achieved (e.g., the patient with hyperlipidemia or hypercholesterolemia (Homozygous Familial Hypercholesterolaemia (HoFH),) is treated). In some embodiments, the efficacious dose is a dose that improves at least one symptom of the patient's Homozygous Familial Hypercholesterolaemia (HoFH), or hyperlipidemia or hypercholesterolemia. In some embodiments, the efficacious dose is a dose that reduces the patient's LDL-C to <135 mg/dL (3.5 mmol/L).

In some embodiments, the lomitapide or a pharmaceutically acceptable salt thereof is administered in escalating doses. In some embodiments, the escalating doses comprise at least a first dose level and a second dose level. In some embodiments, the escalating doses comprise at least a first dose level, a second dose level, and a third dose level. In some embodiments, the escalating doses further comprise a fourth dose level. In some embodiments, the escalating doses further comprise a fifth dose level. In some embodiments, the escalating doses comprise a first dose level, a second dose level, a third dose level, a fourth dose level and a fifth dose level. In some embodiments, six, seven, eight, nine and ten dose levels are contemplated.

In some embodiments, each dose level is no more than 60% of the immediately following dose level. In embodiments, each dose level is no more than 50% of the immediately following dose level. In embodiments, each dose level is no more than 40% of the immediately following dose level. In some embodiments, each dose level is no more than 33% of the immediately following dose level. In some embodiments, each dose level is no more than 20% of the immediately following dose level. In some embodiments, dose levels are separated by % A log units. In some embodiments, dose levels are separated by 1 log unit.

In one aspect, the present disclosure provides a method of safely administering lomitapide, or a pharmaceutically acceptable salt thereof, to a pediatric patient comprising:
(a) administering a first daily dose of about 0.5 mg to about 2.5 mg of lomitapide, or a pharmaceutically acceptable salt thereof to a patient aged 5 to 15 years; and
(b) administering a first daily dose of about 2.5 mg to about 7.5 mg of lomitapide, or a pharmaceutically acceptable salt thereof to a patient aged 16 to 17 years, wherein the first daily dose is administered to the patient for about 1 to 4 weeks.

In some embodiments, the method of safely administering lomitapide, or a pharmaceutically acceptable salt thereof, to a pediatric patient comprises administering a first daily dose of about 2 mg of lomitapide, or a pharmaceutically acceptable salt thereof to a patient aged 5 to 15 years.

In some embodiments, the method of safely administering lomitapide, or a pharmaceutically acceptable salt thereof, to a pediatric patient comprises administering a first daily dose of about 5 mg of lomitapide, or a pharmaceutically acceptable salt thereof to a patient aged 16 to 17 years.

In one aspect, the present disclosure provides a method of treating hyperlipidemia or hypercholesterolemia in a pediatric patient, comprising:
(a) administering a first daily dose of about 0.5 mg to about 2.5 mg of lomitapide, or a pharmaceutically acceptable salt thereof to a patient's age is 5 to 15 years;
(b) administering a first daily dose of about 2.5 mg to about 7.5 mg of lomitapide, or a pharmaceutically acceptable salt thereof to a patient's age is 16 to 17 years,
wherein the first daily dose is administered to the patient for about 1 to 4 weeks.

In some embodiments, the method of treating hyperlipidemia or hypercholesterolemia in a pediatric patient comprises administering a first daily dose of about 2 mg of lomitapide, or a pharmaceutically acceptable salt thereof to a patient aged 5 to 15 years.

In some embodiments, the method of treating hyperlipidemia or hypercholesterolemia in a pediatric patient comprises administering a first daily dose of about 5 mg of lomitapide, or a pharmaceutically acceptable salt thereof to a patient aged 16 to 17 years.

In one aspect, the present disclosure provides a method of treating hyperlipidemia or hypercholesterolemia, comprising:
administering a first daily dose of about 0.5 mg to about 2.5 mg of lomitapide, or a pharmaceutically acceptable salt thereof to a pediatric patient age 5 to 10 years, wherein the first daily dose is administered to the patient for about 1 to 4 weeks.

In one aspect, the present disclosure provides a method of treating hyperlipidemia or hypercholesterolemia, comprising:
administering a first daily dose of about 0.5 mg to about 2.5 mg of lomitapide, or a pharmaceutically acceptable salt thereof to a pediatric patient age 11 to 15 years, wherein the first daily dose is administered to the patient for about 1 to 4 weeks.

In one aspect, the present disclosure provides a method of treating hyperlipidemia or hypercholesterolemia, comprising:
administering a first daily dose of about 2.5 mg to about 7.5 mg of lomitapide, or a pharmaceutically acceptable salt thereof to a pediatric patient age 16 to 17 years, wherein the first daily dose is administered to the patient for about 1 to 4 weeks.

In some embodiments, the first daily dose is administered to the patient for about 4 weeks. In embodiments, the first daily dose is administered for about 1 week to about 6 weeks, including about 1 week, about 2 weeks, about 3 weeks, about 4 weeks, about 5 weeks, or about 6 weeks, including all values and subranges therebetween.

In some embodiments each dose level of lomitapide or a pharmaceutically acceptable salt thereof is administered to the subject for from 2 days to 30 weeks, or more. In some embodiments each dose level is administered to the subject for from about 1 week to about 12 weeks. In some embodiments, each dose level is administered to the subject for about 1 week to about 5 weeks. In some embodiments each dose level is administered to the subject from about 1 to about 4 weeks. In some embodiments each dose level is administered to the subject from about 1 to about 3 weeks. In some embodiments each dose level is administered to the subject from about 1 to about 2 weeks.

In some embodiments, lomitapide or a pharmaceutically acceptable salt is administered. In some embodiments, lomitapide mesylate is administered. In some embodiments, lomitapide or a pharmaceutically acceptable salt thereof is administered orally.

In some embodiments, lomitapide or a pharmaceutically acceptable salt thereof is administered in a daily dose of about 0.1 mg to about 100 mg to a pediatric patients with hyperlipidemia or hypercholesterolemia (Homozygous Familial Hypercholesterolaemia (HoFH)) in need thereof, including about 0.1 mg, about 0.2 mg, about 0.3 mg, about 0.4 mg, about 0.5 mg, about 1 mg, about 2 mg, about 2.5 mg, about 5 mg, about 7.5 mg, about 10 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg to about 100 mg, including any subrange or value therebetween. In some embodiments, about 2 mg to about 60 mg of lomitapide or a pharmaceutically acceptable salt thereof is administered on a daily basis. In some embodiments, about 2 mg to about 20 mg of lomitapide or a pharmaceutically acceptable salt thereof is administered on a daily basis. In some embodiments, about 2 mg to about 40 mg of lomitapide or a pharmaceutically acceptable salt thereof is administered on a daily basis.

In some embodiments, the pediatric patient in need of hyperlipidemia or hypercholesterolemia (e.g., Homozygous Familial Hypercholesterolaemia (HoFH)) treatment is administered a daily dose of 2 mg of lomitapide or a pharmaceutically acceptable salt thereof in the first dosing period, a daily dose of 2 mg of lomitapide or a pharmaceutically acceptable salt thereof in the second dosing period, and a daily dose of 5 mg of lomitapide or a pharmaceutically acceptable salt thereof in the third dosing period, a daily dose of 10 mg of lomitapide or a pharmaceutically acceptable salt thereof in the fourth dosing period, and a daily dose of 20 mg of lomitapide or a pharmaceutically acceptable salt thereof in the fifth dosing period.

In some embodiments, the pediatric patient in need of hyperlipidemia or hypercholesterolemia (e.g., Homozygous Familial Hypercholesterolaemia (HoFH)) treatment is administered a daily dose of 2 mg of lomitapide or a pharmaceutically acceptable salt thereof in the first dosing period, a daily dose of 5 mg of lomitapide or a pharmaceutically acceptable salt thereof in the second dosing period, and a daily dose of 10 mg of lomitapide or a pharmaceutically acceptable salt thereof in the third dosing period, a daily dose of 20 mg of lomitapide or a pharmaceutically acceptable salt thereof in the fourth dosing period, and a daily dose of 40 mg of lomitapide or a pharmaceutically acceptable salt thereof in the fifth dosing period.

In some embodiments, the pediatric patient in need of hyperlipidemia or hypercholesterolemia (e.g., Homozygous Familial Hypercholesterolaemia (HoFH)) treatment is administered a daily dose of 5 mg of lomitapide or a pharmaceutically acceptable salt thereof in the first dosing period, a daily dose of 10 mg of lomitapide or a pharmaceutically acceptable salt thereof in the second dosing period, and a daily dose of 20 mg of lomitapide or a pharmaceutically acceptable salt thereof in the third dosing period, a daily dose of 40 mg of lomitapide or a pharmaceutically acceptable salt thereof in the fourth dosing period, and a daily dose of 60 mg of lomitapide or a pharmaceutically acceptable salt thereof in the fifth dosing period.

In some embodiments, the first dosing period, second dosing period, or third dosing period is about or at least about 1-8 weeks, including about or at least about 1 week, about or at least about 2 weeks, about or at least about 3 weeks, about or at least about 4 weeks, about or at least about 5 weeks, about or at least about 6 weeks, about or at least about 7 weeks, or about or at least about 8 weeks, including all subranges and values therebetween.

In some embodiments, the patient's age is from 5 to 10 years, from 11 to 15 years, or from 16 to 17 years.

In some embodiments of any of the methods disclosed herein, the lomitapide is provided to the patient as an adjunct to a low-fat diet and other lipid-lowering treatments, including LDL apheresis. In some embodiments, concomitant lipid-lowering treatments include one or more of the following: statins, ezetimibe, nicotinic acid, bile acid sequestrant, fibrate, and apheresis.

In some embodiments, the low-fat diet comprises a diet wherein less than about 30% of patient's total calories are from fat, less than about 20% of patient's total calories are from fat, less than about 15% of patient's total calories are from fat, or less than about 10% of patient's total calories are from fat. In some embodiments, the low-fat diet comprises a diet wherein less than about 20% of patient's total calories are from fat.

In some embodiments, patients receiving lipid lowering therapies during treatment with lomitapide are administered dietary supplements that provided approximately 400 international units vitamin E, 210 mg alpha-linolenic acid (ALA), 200 mg linoleic acid, 110 mg eicosapentaenoic acid (EPA), and 80 mg docosahexaenoic acid (DHA) per day.

In some embodiments of any of the methods disclosed herein, administration of lomitapide to a pediatric patient reduces one or more of the following: low-density lipoprotein cholesterol (LDL-C), total cholesterol (TC), apolipoprotein B (apo B), and non-high density lipoprotein cholesterol (non-HDL-C) in patients with homozygous familial hypercholesterolemia (HoFH). In some embodiments, the lomitapide is provided to the patient as an adjunct to a low-fat diet and other lipid-lowering treatments, including LDL apheresis.

In some embodiments, administration of lomitapide to a pediatric patient reduces one or more of the following: low-density lipoprotein cholesterol (LDL-C), total cholesterol (TC), apolipoprotein B (apo B), and non-high density lipoprotein cholesterol (non-HDL-C) in patients with homozygous familial hypercholesterolemia (HoFH).

In some embodiments, administration of lomitapide to a pediatric patient as an adjunct to a low-fat diet and other lipid-lowering treatments (e.g., as disclosed herein) according to any of the methods disclosed herein reduces one or more of the following: low-density lipoprotein cholesterol (LDL-C), total cholesterol (TC), apolipoprotein B (apo B), and non-high density lipoprotein cholesterol (non-HDL-C) by about or at least about 10% to about or at least about 90% or more, including about or at least about 10%, about or at least about 20%, about or at least about 30%, about or at least about 40%, about or at least about 50%, about or at least about 60%, about or at least about 70%, about or at least about 80%, about or at least about 90%, or more, including all values and subranges therebetween.

In embodiments of any of the methods disclosed herein, the maximum dose in a pediatric patient with Child-Pugh A aged from 5 to 10 years is 10 mg.

In embodiments of any of the methods disclosed herein, the maximum dose in a pediatric patient with Child-Pugh A aged from 11 to 15 years is 20 mg.

In embodiments of any of the methods disclosed herein, the maximum dose in a pediatric patient with Child-Pugh A aged from 11 to 15 years is 40 mg.

In some embodiments, the patient's age is from 5 to 10 years and the daily dose of lomitapide in the first dosing period is 2 mg, the daily dose of lomitapide in the second dosing period is 2 mg, and the daily dose of lomitapide in the third dosing period is 5 mg, the daily dose of lomitapide in the fourth dosing period is 10 mg. In some embodiments, the first dosing period is about or at least about 4 weeks, the second dosing period is about or at least about 4 weeks, and the third dosing period is about or at least about 4 weeks, the fourth dosing period is about or at least about 4 weeks, and the fifth dosing period is about or at least about 4 weeks. In some embodiments, the first, second, third, fourth, and fifth dosing periods are each about 4 weeks±3 days.

In some embodiments, the patient's age is from 11 to 15 years and the daily dose of lomitapide in the first dosing period is 2 mg, the daily dose of lomitapide in the second dosing period is 5 mg, the daily dose of lomitapide in the third dosing period is 10 mg, the daily dose of lomitapide is about 20 mg in the fourth dosing period, the daily dose is about 40 mg in the fifth dosing period. In some embodiments, the first dosing period is about or at least about 4 weeks, the second dosing period is about or at least about 4 weeks, and the third dosing period is about or at least about 4 weeks, the fourth dosing period is about or at least about 4 weeks, and the fifth dosing period is about and at least about 4 weeks. In some embodiments, the first, second, third, fourth, and fifth dosing periods are each about 4 weeks±3 days.

In some embodiments, the patient's age is 16 to 17 years and the daily dose of lomitapide in the first dosing period is about 5 mg, the daily dose of lomitapide in the second dosing period is about 10 mg, the daily dose of lomitapide in the third dosing period is about 20 mg, the daily dose of lomitapide in the fourth dosing period is about 40 mg, and the daily dose of lomitapide in the fifth dosing period is about 60 mg. In some embodiments, the first dosing period is about or at least about 4 weeks, the second dosing period is about or at least about 4 weeks, and the third dosing period is about or at least about 4 weeks, the fourth dosing period is about or at least about 4 weeks, and the fifth dosing period is about or at least about 4 weeks. In some embodiments, the first, second, third, fourth, and fifth dosing periods are each about 4 weeks f 3 days.

In some embodiments the daily dose is administered as a single dose or divided into 2 or 3 equal or unequal doses. In some embodiments, the lomitapide is administered once-daily at bedtime.

In some embodiments, lomitapide mesylate in an amount equivalent to about 2-60 mg of the lomitapide free base is administered. In some embodiments, lomitapide mesylate in an amount equivalent to about 2 mg of the lomitapide free base is administered. In some embodiments, lomitapide mesylate in an amount equivalent to about 2.5 mg of the lomitapide free base is administered. In some embodiments, lomitapide mesylate in an amount equivalent to about 5 mg of the lomitapide free base is administered. In some embodiments, lomitapide mesylate in an amount equivalent to about 10 mg of the lomitapide free base is administered. In some embodiments, lomitapide mesylate in an amount equivalent to about 30 mg of the lomitapide free base is administered. In some embodiments, lomitapide mesylate in an amount equivalent to about 40 mg of the lomitapide free base is administered. In some embodiments, lomitapide mesylate in an amount equivalent to about 60 mg of the lomitapide free base is administered.

In some embodiments, the patient has homozygous familial hypercholesterolemia.

Kits

In some embodiments, the present disclosure provides kits for use in treating hyperlipidemia or hypercholesterolemia (e.g., Homozygous Familial Hypercholesterolaemia (HoFH)) in a patient in need thereof. Such kits comprise lomitapide or a pharmaceutically salt thereof. The kits of the present disclosure may be used for administering lomitapide or a pharmaceutically acceptable salt thereof at different dosage intervals, or for titrating the dose of lomitapide or a pharmaceutically acceptable salt thereof according to methods described herein. For example, the present disclosure provides kits for treating hyperlipidemia or hypercholesterolemia (e.g., Homozygous Familial Hypercholesterolaemia (HoFH)) in a pediatric subject, comprising at least three sets of pharmaceutical dosage units; and instructions for use.

In some embodiments, the kits of the present disclosure may comprise directions for administration. For example, the kit can include instructions to administer lomitapide or a pharmaceutically acceptable salt thereof in a suitable manner to perform the methods described herein, e.g., in a suitable dose, dosage form, dosing intervals (e.g., as described herein). In some embodiments, the informational material can include instructions to administer the lomitapide or a pharmaceutically acceptable salt thereof to a pediatric patient with hyperlipidemia or hypercholesterolemia (e.g., Homozygous Familial Hypercholesterolaemia (HoFH)).

The kit can include one or more containers for lomitapide or a pharmaceutically salt thereof as described herein. In some embodiments, the kit contains separate containers, dividers or compartments for the composition and informational material. For example, the composition can be contained in a bottle, vial, or syringe. In some embodiments, the separate elements of the kit are contained within a single, undivided container. For example, the composition is contained in a bottle, vial or syringe that has attached thereto the informational material in the form of a label. In some embodiments, the kit includes a plurality (e.g., a pack) of individual containers, each containing one or more unit dosage forms (e.g., a dosage form described herein) of a composition described herein. For example, the kit can include a plurality of syringes, ampules, or foil packets each containing a single unit dose of a composition described herein. An example of such a kit is a blister pack, as typically used for the packaging of tablets, capsules and the like. The containers of the kits can be air tight, waterproof (e.g., impermeable to changes in moisture or evaporation), and/or light-tight.

In some embodiments, provided herein is a kit for safely administering lomitapide, or a pharmaceutically acceptable salt thereof, to a pediatric patient aged 5 to 15 comprising: a first daily dose of about 0.5 mg to about 2.5 mg of lomitapide, or a pharmaceutically acceptable salt thereof.

In some embodiments, provided herein is a kit for safely administering lomitapide, or a pharmaceutically acceptable salt thereof, to a pediatric patient aged 16 to 17 years, comprising a first daily dose of about 2.5 mg to about 7.5 mg of lomitapide, or a pharmaceutically acceptable salt thereof.

In some embodiments, provided herein is a kit for treating hyperlipidemia or hypercholesterolemia (e.g., homozygous familial hypercholesterolemia) in a pediatric patient aged 5 to 15 years comprising: a first daily dose of about 0.5 mg to about 2.5 mg of lomitapide, or a pharmaceutically acceptable salt thereof.

In some embodiments, provided herein is a kit for treating hyperlipidemia or hypercholesterolemia (e.g., homozygous familial hypercholesterolemia) in a pediatric patient aged 16 to 17 years, comprising a first daily dose of about 2.5 mg to about 7.5 mg of lomitapide, or a pharmaceutically acceptable salt thereof.

In some embodiments, provided herein is a kit for treating hyperlipidemia or hypercholesterolemia (e.g., homozygous familial hypercholesterolemia) in a pediatric patient aged 5 to 10 years comprising: a first daily dose of about 0.5 mg to about 2.5 mg of lomitapide, or a pharmaceutically acceptable salt thereof.

In some embodiments, provided herein is a kit for treating hyperlipidemia or hypercholesterolemia (e.g., homozygous familial hypercholesterolemia) in a pediatric patient aged 11 to 15 years comprising: a first daily dose of about 0.5 mg to about 2.5 mg of lomitapide, or a pharmaceutically acceptable salt thereof.

In some embodiments, provided herein is a kit for treating hyperlipidemia or hypercholesterolemia in a pediatric patient aged 16 to 17 years comprising a first daily dose of about 2.5 mg to about 7.5 mg of lomitapide, or a pharmaceutically acceptable salt thereof.

In some embodiments of the kits provided herein, the kit contains a first daily dose to be administered to the pediatric patient for about 1 to 4 weeks, including about 1 week, about 2 weeks, about 3 weeks and about 4 weeks. In some embodiments, the kit contains a first daily dose to be administered to the pediatric patient for about 4 weeks.

In some embodiments of the kits provided herein for treating hyperlipidemia or hypercholesterolemia (e.g., Homozygous Familial Hypercholesterolaemia (HoFH)) in a pediatric patient, the kit contains a daily dose of 2 mg of lomitapide or a pharmaceutically acceptable salt thereof to be administered in a first dosing period, a daily dose of 2 mg of lomitapide or a pharmaceutically acceptable salt thereof to be administered in a second dosing period, a daily dose of 5 mg of lomitapide or a pharmaceutically acceptable salt thereof to be administered in a third dosing period, a daily dose of 10 mg of lomitapide or a pharmaceutically acceptable salt thereof to be administered in a fourth dosing period, and a daily dose of 20 mg of lomitapide or a pharmaceutically acceptable salt thereof to be administered in a fifth dosing period.

In some embodiments of the kits provided herein for treating hyperlipidemia or hypercholesterolemia (e.g., Homozygous Familial Hypercholesterolaemia (HoFH)) in a pediatric patient, the kit contains a daily dose of 2 mg of lomitapide or a pharmaceutically acceptable salt thereof to be administered in a first dosing period, a daily dose of 5 mg of lomitapide or a pharmaceutically acceptable salt thereof to be administered in a second dosing period, a daily dose of 10 mg of lomitapide or a pharmaceutically acceptable salt thereof to be administered in a third dosing period, a daily dose of 20 mg of lomitapide or a pharmaceutically acceptable salt thereof to be administered in a fourth dosing period, and a daily dose of 40 mg of lomitapide or a pharmaceutically acceptable salt thereof to be administered in a fifth dosing period.

In some embodiments of the kits provided herein for treating hyperlipidemia or hypercholesterolemia (e.g., Homozygous Familial Hypercholesterolaemia (HoFH)) in a pediatric patient, the kit contains a daily dose of 5 mg of lomitapide or a pharmaceutically acceptable salt thereof to be administered in a first dosing period, a daily dose of 10 mg of lomitapide or a pharmaceutically acceptable salt thereof to be administered in a second dosing period, a daily dose of 20 mg of lomitapide or a pharmaceutically acceptable salt thereof to be administered in a third dosing period, a daily dose of 40 mg of lomitapide or a pharmaceutically acceptable salt thereof to be administered in a fourth dosing period, and a daily dose of 60 mg of lomitapide or a pharmaceutically acceptable salt thereof to be administered in a fifth dosing period.

In embodiments of any of the kits disclosed herein, the kit may comprise lomitapide dosage units for administration to a pediatric patient aged about 5-10 years, or about 11-15 years, or about 16 to ≤17 years.

In some embodiments, the present disclosure provides a kit for use in any one of the methods disclosed herein, comprising lomitapide dosage units to be administered to a pediatric patient aged about 5-10 years, wherein the dosage units are shown in the Table below. In some embodiments, when the pediatric patient aged about 5-10 years is classified as Child-Pugh A, then the maximum dose is 10 mg.

| Week | Lomitapide Daily Dose (mg) |
| --- | --- |
| 1 | 2 |
| 4 +/− 3 days | 2 |
| 8 +/− 3 days | 5 |
| 12 +/− 3 days | 10 |
| 16 +/− 3 days | 20 |

In some embodiments, the present disclosure provides a kit for use in any one of the methods disclosed herein, comprising lomitapide dosage units to be administered to a pediatric patient aged about 5-10 years, wherein the dosage units are shown in the Table below.

| Week | Lomitapide Daily Dose (mg) |
| --- | --- |
| 1 | 2 |
| 4 +/− 3 days | 2 |
| 8 +/− 3 days | 5 |
| 12 +/− 3 days | 10 |
| 16 +/− 3 days | 10 |

In some embodiments, the present disclosure provides a kit for use in any one of the methods disclosed herein, comprising lomitapide dosage units to be administered to a pediatric patient aged about 11-15 years, wherein the dosage units are shown in the Table below. In some embodiments, when the pediatric patient aged about 11-15 years is classified as Child-Pugh A, then the maximum dose is 20 mg.

| Week | Lomitapide Daily Dose (mg) |
| --- | --- |
| 1 | 2 |
| 4 +/− 3 days | 5 |
| 8 +/− 3 days | 10 |
| 12 +/− 3 days | 20 |
| 16 +/− 3 days | 40 |

In some embodiments, the present disclosure provides a kit for use in any one of the methods disclosed herein, comprising lomitapide dosage units to be administered to a pediatric patient aged about 11-15 years, wherein the dosage units are shown in the Table below.

| Week | Lomitapide Daily Dose (mg) |
| --- | --- |
| 1 | 2 |
| 4 +/− 3 days | 5 |
| 8 +/− 3 days | 10 |
| 12 +/− 3 days | 20 |
| 16 +/− 3 days | 20 |

In some embodiments, the present disclosure provides a kit for use in any one of the methods disclosed herein, comprising lomitapide dosage units to be administered to a pediatric patient aged about 16 to <17 years, wherein the dosage units are shown in the Table below. In some embodiments, when the pediatric patient aged about 16 to ≤17 years is classified as Child-Pugh A, then the maximum dose is 40 mg.

| Week | Lomitapide Daily Dose (mg) |
| --- | --- |
| 1 | 5 |
| 4 +/− 3 days | 10 |
| 8 +/− 3 days | 20 |
| 12 +/− 3 days | 40 |
| 16 +/− 3 days | 60 |

In some embodiments, the present disclosure provides a kit for use in any one of the methods disclosed herein, comprising lomitapide dosage units to be administered to a pediatric patient aged about 16 to 17 years, wherein the dosage units are shown in the Table below.

| Week | Lomitapide Daily Dose (mg) |
|---|---|
| 1 | 5 |
| 4 +/− 3 days | 10 |
| 8 +/− 3 days | 20 |
| 12 +/− 3 days | 40 |
| 16 +/− 3 days | 40 |

The following non-limiting examples illustrate various aspects of the present invention.

EXAMPLES

Example 1

The objective of this study was to use determine pediatric starting doses for different age ranges that yield systemic exposures that are similar to those achieved in adults aged 18-55 following a 5 mg oral dose using allometric scaling and physiologically-based (PBPK) modeling and simulation approaches.

Method for Allometric Scaling Approach

The first allometric scaling approach for oral clearance in pediatrics is based on the PK relationship:

AUCsteady state=Daily Dose/(CL/F).

Therefore, $AUC_{steady\ state,\ adults}$=Daily $Dose_{adults}/(CL/F)_{adults}$. $AUC_{steady\ state,\ pediatrics}$=Daily $Dose_{pediatrics}/(CL/F)$ pediatrics. To enable $AUC_{steady\ state,\ adults}$=$AUC_{steady\ state,\ pediatrics}$, Daily $Dose_{adults}/(CL/F)_{adults}$=Daily $Dose_{pediatrics}/(CL/F)_{pediatrics}$. Then Daily $Dose_{pediatrics}$=Daily $Dose_{adults}*[(CL/F)_{pediatrics}/(CL/F)_{adults}]$. From this equation, it can be seen that the required daily dose in pediatrics is a function of adult dose, adult oral clearance and pediatric oral clearance.

Allometric scaling approach for oral clearance (CL/F) was determined using the following equation $$Cl/F = TV(Cl/F) \cdot \frac{PNA^{0.83}}{PNA^{0.83} + 0.31} \cdot \left(\frac{BW}{70}\right)^{0.75}$$

Method for PBPK Modelling

For the PBPK modeling approach, Simcyp population-based simulator (version 12.2) was used to select the doses for pediatrics age groups that will achieve 80-125% $AUC_{geometric\ mean}$ and $Cmax_{geometric\ mean}$ in pediatric subjects (2-18 year old, 50% male) compared to mean AUC and Cmax in adults after 5 mg oral dosing (18-55 year old, 50% male). 10 trials were simulated with 20 virtual healthy subjects (adults or children) in each trial. The point estimate and 95% confidence interval around the $AUC_{geometric}$ mean and $Cmax_{geometric\ mean}$ were compared between different doses. The following statistics were adopted in the analysis: 1) Null hypothesis: point estimates of geometric means for AUC and Cmax between children and adults differ more than 20%, i.e., they are not equivalent (note that the alternative hypothesis is that the point estimates of geometric means for AUC and Cmax in children and adults are equivalent; 2) Statistical test: two-tailed t-test, P=0.05; 3) Variance criteria: 95% confidence interval around the AUCgeometric mean and Cmax,geometric mean, 0.8-1.25 limits. Simcyp estimated human jejunum permeability based on lomitapide physicochemical properties (Peff, man=9.55*10-4 cm/s) was used, which allows for Qgut estimation for each age group that accounts for age-dependent blood flow in intestinal villi that reflects age-dependent cardiac output (14). In the adult group, the estimated Qgut (15.6 L/hr) is similar to previously used fixed Qgut input (17.9 L/hr). The major assumptions made in the model used for simulations were: 1) The fraction of dose absorbed into enterocytes (F(a)) is the same between adults and pediatrics; 2) CYP3A4 accounts for 100% of lomitapide metabolism (elimination) in both children and adults.

Results

By comparing the calculated doses using both physiologically-based pharmacokinetic (PBPK) modeling and allometric scaling approaches (FIG. 2), the first-in-pediatric doses above 5 years old shown in the table below were proposed.

| Age groups | Suggested starting dose (mg) |
|---|---|
| 5-10 | 2 |
| 11-15 | 2 |
| 16-18 | 5 |

Example 2

This clinical study is a single-arm, open-label, international, multi-center study to evaluate the efficacy and safety of lomitapide in pediatric patients with Homozygous Familial Hypercholesterolaemia (HoFH) on stable lipid-lowering therapy.

The efficacy of lomitapide is measured by the percent change in low-density lipoprotein cholesterol (LDL-C) at the maximum tolerated dose (MTD) at Week 24±3 days compared to Baseline, when added to stable lipid-lowering therapy (LLT, including lipoprotein apheresis [LA] where applicable) in pediatric patients (5 to ≤17 years of age) with HoFH.

The efficacy of lomitapide in pediatric HoFH patients is also assessed by:
  Percent change from Baseline at Week 24±3 days in lipid parameters, including total cholesterol (TC), non high-density lipoprotein cholesterol (Non-HDL-C), very low-density lipoprotein cholesterol (VLDL-C), triglycerides (TG), lipoprotein(a) [Lp(a)], and apolipoprotein B (apo B);
  Percent change from Baseline in TC, non-HDL-C, LDL-C, TG, VLDL-C, Lp(a), and apo B at all other timepoints through Week 104±1 week;
  Change in LLT and LA from Week 24±3 days through Week 104±1 week; and
  Number (percent) of pediatric HoFH patients achieving the European Atherosclerosis Society (EAS) recommended target LDL-C of <135 mg/dL (3.5 mmol/L) at Week 24±3 days and at any time on study.

Abbreviations:

| Term or Abbreviation | Description |
|---|---|
| AE | Adverse event |
| ALA | Alpha-linolenic acid |
| ALT | Alanine transaminase |
| AP | Alkaline phosphatase |
| apo A-I | Apolipoprotein A-I |
| apo B | Apolipoprotein B |
| ASCVD | Atherosclerotic cardiovascular disease |
| AST | Aspartate transaminase |
| ATC | Anatomical Therapeutic Chemical |

| Term or Abbreviation | Description |
| --- | --- |
| BMI | Body mass index |
| BG | Blood glucose |
| BSA | Body surface area |
| BUN | Blood urea nitrogen |
| CBC | Complete blood count |
| CK | Creatinine kinase |
| $C_{max}$ | Maximum concentration |
| CVD | Cardiovascular disease |
| CYP | Cytochrome P 450 |
| DHA | Docosahexaenoic acid |
| EAS | European Atherosclerosis Society |
| ECG | Electrocardiogram |
| eCRF | Electronic Case Report Form |
| EFA | Essential fatty acids |
| EMA | European Medicines Agency |
| EPA | Eicosapentaenoic acid |
| EoT | End of Treatment |
| FDA | Food and Drug Administration |
| FH | Familial Hypercholesterolaemia |
| GGT | Gamma-glutamyl transferase |
| GFR | Glomerular filtration rate |
| HBsAg | Hepatitis B surface antigen |
| Anti-HBC | Antibody to Hepatitis C |
| HDL-C | High-density lipoprotein cholesterol |
| HMG-COA | 3-hydroxy-3-methylglutaryl coenzyme A |
| HoFH | Homozygous familial hypercholesterolaemia |
| IU | International units |
| LA | Lipoprotein apheresis |
| LDL | Low-density lipoprotein |
| LDL-C | Low-density lipoprotein cholesterol (conventional mg/dl units can be converted to SI [mmol/L] units using the factor 0.0259) |
| LDLR | LDL receptor |
| LDLRAP1 | LDL-receptor adapter protein 1 |
| LLT | Lipid-lowering therapy (including LA, where applicable) |
| Lp(a) | Lipoprotein a |
| LTE | Long-term extension |
| MTD | Maximum tolerated dose |
| MTP | Microsomal triglyceride transfer protein |
| Non-HDL-C | Non-high-density lipoprotein cholesterol |
| NYHA | New York Heart Association |
| PCSK9 | Proprotein convertase subtilisin/kexin type 9 |
| PK | Pharmacokinetics |
| SmPC | Summary of Product Characteristics |
| TC | Total cholesterol |
| TG | Triglycerides |
| ULN | Upper limit of normal |
| VLDL-C | Very low density lipoprotein cholesterol |
| WHO | World Health Organization |
| MTD | Maximum tolerated dose |
| MTP | Microsomal triglyceride transfer protein |
| Non-HDL-C | Non-high-density lipoprotein cholesterol |
| NYHA | New York Heart Association |
| PCSK9 | Proprotein convertase subtilisin/kexin type 9 |
| PK | Pharmacokinetics |
| SmPC | Summary of Product Characteristics |
| TC | Total cholesterol |
| TG | Triglycerides |
| ULN | Upper limit of normal |
| VLDL-C | Very low density lipoprotein cholesterol |
| WHO | World Health Organization |

Inclusion Criteria:

Patients eligible for participation include all of the following criteria:

1. Male and female patients aged 5 to ≤17 years with HoFH as defined by any of the following criteria recommended by the Consensus Panel on Familial Hypercholesterolaemia of the EAS (Cuchel, Bruckert et al. 2014):

Genetic confirmation of 2 mutant alleles at the LDLR, apo B, PCSK9, or LDLRAP1 gene locus OR An untreated LDL-C >500 mg/dL (13 mmol/L) or treated LDL-C ≥300 mg/dL (8 mmol/L) together with either Cutaneous or tendon xanthoma before age 10 years or Untreated LDL-C levels consistent with heterozygous FH in both parents 2. Baseline LDL-C on LLT (Cmax of LDL-C immediately prior to LA, if applicable)

>160 mg/dL (4.1 mmol/L, no documented CVD) or

>130 mg/dL (3.4 mmol/L, established CVD defined as aortic valve disease and/or coronary atherosclerosis)

3. Body weight ≥15 kg or BMI and height both >$10^{th}$ percentile according to WHO Growth Charts for Boys and Girls 5 to 19 Years of Age (see WHO Growth Charts)

4. Patient and/or his/her legal representative are informed, have read and understood the patient information/ informed consent form, and have given written informed assent/consent 5. Patient and/or his/her legal representative follow study procedures and instructions, particularly that LLT (including LA when applicable) is stable for at least 6 weeks prior to Baseline (Run-in Period) and remains stable through Week 24±3 days (end of Efficacy Phase)

The patient is compliant with both the low-fat diet supplying <20% of energy (calories) from fat or <30 g fat, whichever is the lesser amount starting at the beginning of the Run-in Period and the dietary supplement regimen starting at Week −2 of the Run-in Period, both continuing until completion of the study (and the LTE of this study, when applicable)

6. Postmenarchal female adolescents use an effective form of birth control with failure rates <1% per year (e.g., implant, injectable, combined oral contraceptive, intrauterine contraceptive device, sexual abstinence, vasectomy or vasectomised partner) during participation in the study (and at least 4 weeks thereafter). Patients taking oestrogen-based oral contraceptives are advised about possible loss of effectiveness due to diarrhea and/or vomiting. Additional contraceptive measures are used for 7 days after resolution of symptoms.

7. Patient must be in stable physical and mental health at screening

Exclusion Criteria:

Patients are not included if any of the following criteria apply:

1. Other forms of primary hyperlipoproteinaemia and secondary causes of hypercholesterolaemia (e.g., nephrotic syndrome, hypothyroidism)

2. Contraindications for the use of lomitapide according to section 4.3 of the EMA Summary of Product Characteristics (SmPC), such as hypersensitivity to the active substance or to any of the excipients listed in Section 6.1 of the SmPC, known significant or chronic inflammatory bowel disease or malabsorption 3. Moderate (Child-Pugh B) or severe hepatic impairment (Child-Pugh C), active liver disease and/or abnormal liver function tests at screening (AST or ALT >1.5× ULN and/or total bilirubin >1.5×ULN in the absence of Gilbert's syndrome or AP >1.5×ULN [based on appropriate age and gender normal values])

4. Serum CK >2×ULN
5. Chronic renal insufficiency with glomerular filtration rate (GFR) <70 mL/min/1.73 m² calculated using the Schwartz formula
6. Uncontrolled hypertension (defined as mean systolic and/or diastolic blood pressure ≥95% of normal for age and sex) despite medical therapy
7. New York Heart Association (NYHA) Class III or IV congestive heart failure
8. Precocious/delayed puberty or endocrine disorder affecting growth (e.g., hypothyroidism, premature adrenarche)
9. History of drug abuse within the last 3 years or habitual alcohol consumption (defined as >1 ounce [28 g] of liquor or 4-ounce glass [113 g] of wine, or the equivalent, ≥3 times per week)
10. Life expectancy predicted to be <5 years
11. History of a non-skin malignancy (with the exception of cervical cancer in situ) within 3 years prior to enrolment
12. Treatment with any Investigational Medicinal Product (IMP) within 6 months or 5 times the terminal half-life of the corresponding IMP, whichever is longer, before the screening visit
13. Patient is a dependent of the sponsor, of the investigational team or his/her immediate family
14. Pregnant or nursing women Outcomes The primary efficacy endpoint is:
Percent change in LDL-C at Week 24±3 days compared to Baseline Secondary Endpoints The Secondary Efficacy Endpoints of this Study are:
Percent change from Baseline at Week 24±3 days for the following lipid parameters: TC, Non-HDL-C, VLDL-C, TG, Lp(a), and apo B
Percent change from Baseline at all other time points through Week 104±1 week for the following lipid parameters: LDL-C, TC, Non-HDL-C, VLDL-C, TG, Lp(a), and apo B
Change in LLT and LA from Week 24±3 days through Week 104±1 week
Total number and percent of patients achieving the EAS recommended target LDL-C of <135 mg/dL (3.5 mmol/L) in pediatric HoFH patients at Week 24±3 days and at any time on study Statistical Methods The key efficacy and safety analyses are conducted once all patients have completed or withdrawn prior to Visit 10 at Week 24±3 days (End of the Efficacy Phase) upon entry and cleaning of all data including Visit 10 in order to allow for an early submission of an application for regulatory approval of Lojuxta® in the pediatric indication. All descriptive statistics of the efficacy parameters and all analyses of safety data collected during the Safety Phase are performed after all data up to the FU Visit 23 (Week 108) has been entered and cleaned (including AE and concomitant medication data with date of onset until FU visit [Week 108]).

Study Medications

Formulation, Packaging and Labelling

The investigational product is supplied in high-density polyethylene bottles with polyester, aluminium foil, and cardboard induction seals and child-resistant polypropylene screw caps. It is packed and labelled according to applicable regulatory requirements.

Lomitapide is prepared as a crystalline methanesulfonate salt. The investigational product is administered orally in opaque, hard gelatin capsules. Four bottle types contain 28 capsules each by 2 mg, 5 mg, 10 mg, and 20 mg strength. Each hard capsule contains lomitapide mesylate equivalent to the labeled content of the free-base form of lomitapide, and the following inactive excipients: pregelatinised starch (maize), sodium starch glycolate (Type A), microcrystalline cellulose, lactose monohydrate, colloidal, anhydrous silica, and magnesium stearate.

Drug and Dietary Supplements Accountability

A sufficient number of lomitapide bottles are provided to sites in bulk at appropriate intervals depending on the phase of the study and accrual of patients. Dietary supplements are sourced locally, where possible. The investigator, or the person designated by the investigator, are responsible for dispensing the appropriate bottle or combination of bottles to a patient at each study visit. At each site, the investigator, or the person designated by the investigator, is responsible for keeping accurate records of study medication accountability comprising the receipt, the dispensing, and the return of all used and partially unused study medication throughout the study. The drug accountability form is kept up to date and will be reviewed periodically by the study monitor. Patients are asked to keep all used and partially unused bottles of study medication and return them to the site during the scheduled visits. For drug accountability, the number of used and partially unused bottles and unused capsules are counted. Compliance with dietary supplements is discussed with the patients at each visit and is documented in the electronic Case Report Form (eCRF). It is also verified by reviewing the patient Diet Records. After drug accountability is completed, all unused or partially used study medication are returned to the sponsor or disposed of by the study site. The study monitor instructs the site on the return of all study medication. A final inventory of the total amount of study medication and dietary supplements at each study site against the amount used and returned is recorded. Inventory records are readily available for inspection by the study monitor and/or auditor, and open to government inspection at any time.

Dietary Supplements

Patients are administered daily oral supplementation with vitamin E (200 IU for patients 5 to 8 years of age, 400 IU for patients 9 to ≤17 years of age) and an EFA supplement containing approximately 200 mg linoleic acid, 210 mg ALA, 110 mg EPA, and 80 mg DHA. Dietary supplements is dispensed during Visit 3 at Week −3 to Week −2 (Run-in Compliance), during Visit 4 at D0 (Baseline, Efficacy Phase), and at every visit thereafter until Visit 21 at Week 92±1 week.

Diet Instructions and Diet Records

The occurrence and severity of GI AEs associated with the use of lomitapide decreases in the presence of a low-fat diet. Patients start to follow a diet supplying <20% of energy from fat or <30 g fat, whichever is the lesser amount at Visit 2, the Start of the Run-in Period, and continue this diet until the EoT (and the LTE of this study, when applicable).

A dietitian provides dietary counselling to the patients and their parents/legal guardians from Visit 2 (Start of the Run-in Period) through Visit 5 at Week 4±3 days. Patients and parents/legal guardians are instructed on how to consume <20% energy from fat or <30 g fat, whichever is the lesser amount. Instructions include detailed information concerning the role of dietary fat and GI-related symptoms and patients are encouraged to pay special attention to foods they eat when/if they experience these symptoms. The dietitian reviews current eating habits in order to minimize adverse events and address potential adherence problems. The dietitian alsotailors to each patient's caloric needs to ensure a healthy weight and normal growth is maintained.

The dietitian also reviews compliance with the diet and discusses any issues or concerns the patient and his/her parents/legal guardians may have with the diet at Visit 3 (Week −3 to Week −2). The dietitian informs patients and their parents/legal guardians to call him/her to discuss over the phone or schedule a meeting to address any diet-related questions or concerns any time during the study. Additional resources pertaining to the diet are available to the dietitian and the patient and his/her parent/legal guardian.

Weight is measured using a consistent approach at Screening and at each visit after the Run-in Period (i.e., child/adolescent always weighed in same amount of clothing, either in underwear, hospital gowns or by subtracting the weight of clothes). Patients of normal or below normal body weight with weight loss >3% since the last visit are instructed by the dietitian on how to increase caloric intake based on individual needs. The standard recommended fat intake for children >2 years old is to follow a diet with <30% energy from fat, hence, decreasing dietary fat intake to <20% or <30 g fat, whichever is the lesser amount should not pose any risk to patients of any age that may be enrolled in this study.

The investigator requests additional dietary counselling as clinically indicated. At the same visits, 2-Day Diet Records are given to the patients and their parents/legal guardians.

In order to assess dietary compliance and to provide information for interpreting possible GI AEs, patients are instructed to document all food and beverages consumed periodically throughout the study, using Diet Records. A 2-Day Diet Record is dispensed and returned from Visit 2 (Start of the Run-in Period) through Visit 21 at Week 92±1 week.

When diet-related problems are noted during the study, e.g., weight loss or GI-related complaints such as diarrhoea, the patients are requested to fill out additional Diet Records. Note that Diet Records collected during the Run-in Period are not analysed, but are used by the dietitian on site to assess compliance before beginning lomitapide treatment.

Patients treated with lomitapide and their parents/legal guardians are advised of the potential risk of dehydration in relation to GI AEs and take precautions to avoid fluid depletion.

Study Design

This is a single-arm, open-label, multi-centre phase III study to evaluate the efficacy and long-term safety of lomitapide in pediatric patients with HoFH receiving stable LLT (including LA, when applicable). Each patient participates for up to 120 weeks (about 2.5 years) in the study (see FIG. 2).

The study consists of 5 periods (see FIG. 2):
1. Screening Period (starting at Week −12, i.e. ≤12 weeks prior to Baseline for up to 6 weeks)
2. Stratified Enrolment and Start of Run-in Period (starting at minimum at Week −6, i.e., 6 weeks prior to Baseline for a minimum of 6 weeks):
   Enrolment is stratified to ensure approximately equal numbers of patients in the following age groups: 5 to 10 years, 11 to 15 years, and 16 to ≤17 years (with ≥8 patients in any individual age group).
   Patients are stabilised on current LLT (including LA, when applicable) and established on a diet supplying <20% of energy (calories) from fat or <30 g fat, whichever is the lesser amount.
   Daily supplementation with vitamin E (200 international units [IU] for patients 5 to 8 years of age, 400 IU for patients 9 to ≤17 years of age) and an EFA supplement containing approximately 200 mg linoleic acid, 210 mg ALA, 110 mg EPA, and 80 mg DHA starting at Week −2
3. Efficacy Phase (starting at Baseline, i.e. Day [D]0 for 24 weeks±3 days)
   Approximately 45 pediatric patients with HoFH are treated with lomitapide given orally, added to their current, stable LLT (including LA, when applicable) established during the Run-in Period
   Assuming a withdrawal rate of approximately 33% by Week 24±3 days, this results in 30 evaluable patients at Week 24±3 days (with ≥8 patients in any individual age group).
   After the stabilization of the patient on his/her current MTD of LLT (including LA, when applicable) during the 6-week Run-in Period, treatment with lomitapide is started as an add-on therapy on D0 of the Efficacy Phase.
   Dosing is initiated at the recommended starting dose and escalated to the maximum dose as applicable to the age groups based upon safety and tolerability in addition to LDL-C values.
   The first dose of study medication is administered at the study site on D0.
   During the 24-week Efficacy Phase, patients are required to remain on the stable LLT regimen (including LA, when applicable) established during the 6-week Run-in Period
4. Safety Phase (starting at Week 24±3 days for 80±1 weeks)
   Patients enter the 80-week Safety Phase after the Week 24±3 days assessments have been completed. Each patient continues receiving the MTD of lomitapide he/she achieved during the Efficacy Phase (unless criteria is met for reducing the dose) for an additional 80±1 weeks in the Safety Phase.
   When after Week 24±3 days, a patient has crossed over into the next age category, the study medication is escalated to the maximum dose applicable for the new age category. When the patient tolerates this new dose for ≥4 weeks, then this is considered the new MTD.
   As necessary during the 80-week Safety Phase, the lomitapide dose is reduced from the MTD due to tolerability or safety issues, and the patient is re-challenged after a minimum period of 4 weeks following dose reduction with a higher dose of lomitapide once these issues resolve, but the dose during the Safety Phase does not exceed the MTD established during the Efficacy Phase.
   Adjustments to background LLT (including LA, when applicable) are allowed at the discretion of the investigator.
5. Follow-up (starting at Week 104±1 week for 4 weeks) or participation in the LTE of this study
   At Week 104±1 week, eligible patients who complete the study per protocol can enter the LTE of this study, pending approval by appropriate ethics committees and regulatory authorities. A separate Protocol Amendment is prepared describing the LTE in detail.

For patients who opt not to participate in the LTE of this study or who are ineligible, there is a 4-week Follow-up period during which study medication is discontinued and patients remain on concomitant LLT (including LA, when applicable)

Interventions

This is an open-label study, blinding of treatment is not applicable.

After the stabilization of the patient on his/her current MTD of LLT (including LA when applicable) during the 6-week Run-in Period, treatment with lomitapide is started as add-on therapy on D0 of the Efficacy Phase.

Lomitapide capsules is provided in 4 dose strengths of 2 mg, 5 mg, 10 mg, and 20 mg. Dosing is initiated at the recommended starting dose and escalated to the maximum dose as applicable to the age groups (see Table 1 and FIG. 2) based upon safety and tolerability in addition to LDL-C values.

TABLE 1

Lomitapide Starting Dose and Dose Escalation by Age Group

| Age Group (years) | Lomitapide Dose (mg) | | | | | |
|---|---|---|---|---|---|---|
| | D0 | Week 4 ±3 days | Week 8 ±3 days | Week 12 ±3 days | Week 16 ±3 days | Maximum |
| 5 to 10 | 2 | 2 | 5 | 10 | 20 | 20 (10, in Child-Pugh A) |
| 11 to 15 | 2 | 5 | 10 | 20 | 40 | 40 (20, in Child-Pugh A) |
| 16 to ≤17 | 5 | 10 | 20 | 40 | 60 | 60 (40, in Child-Pugh A) |

Each patient takes 1 to 3 capsule(s) once daily to achieve the doses specified in the titration scheme. The first dose of study medication is administered at the study site on D0.

As of D1, patients self-administer (or the patient's parent/legal guardian administers to the patient) lomitapide orally, once daily, at approximately the same time each day. Ideally, lomitapide is administered at least 2 hours after the evening meal (e.g., at bedtime) with a glass of water on an empty stomach because the fat content of a recent meal may adversely impact GI tolerability. Patients who are unable to swallow the intact capsule(s) open the capsule(s) and sprinkle the capsule content on 1 tablespoon of apple sauce or mashed banana, which are fat-free.

In case of a missed dose, patients are instructed to take missed doses of lomitapide only if they can be taken at least 12 hours prior to the next scheduled dose. Dietary supplements are ideally taken in the morning. Patients taking bile acid sequestrants are reminded that they should take lomitapide 4 hours before or 4 hours after this class of medications. If atorvastatin is given concomitantly, lomitapide is administered 12 hours apart.

What is claimed:

1. A method of treating homozygous familial hypercholesterolemia (HoFH) in a pediatric patient aged 5 to 10 years in need thereof, comprising administering lomitapide or a pharmaceutically acceptable salt thereof to the patient, wherein said administration comprises:
   (i) administering an initial dose of 2 mg per day of lomitapide, or a pharmaceutically acceptable salt thereof, to the patient for about 8 weeks;
   (i) titrating the initial dose to a second dose, wherein the second dose is 5 mg per day of lomitapide, or pharmaceutically acceptable salt thereof, and wherein the second dose is administered for about 4 weeks;
   (iii) titrating the second dose to a third dose, wherein the third dose is 10 mg per day of lomitapide, or pharmaceutically acceptable salt thereof, and wherein the third dose is administered for about 4 weeks; and
   (iv) titrating the third dose up to a maximum daily dose of 20 mg per day of lomitapide, or pharmaceutically acceptable salt thereof.

2. The method of claim 1, wherein the administration provides a reduction in the patient's low-density lipoprotein (LDL-C) compared to prior to the administration.

3. The method of claim 1, wherein the administration provides a reduction in the patient's LDL-C to less than 135 mg/dL.

4. The method of claim 1, wherein the administration provides a reduction in the patient's total cholesterol (TC), apolipoprotein B (apo B), non-high-density lipoprotein cholesterol (non-HDL-C), very low-density lipoprotein cholesterol (VLDL-C), triglyceride, and high-density lipoprotein cholesterol (HDL-C) compared to prior to the administration.

5. The method of claim 1, wherein the patient is on a stable lipid-lowering therapy.

6. The method of claim 1, further comprising administering to the patient vitamin E, alpha-linolenic acid, linoleic acid, eicosapentaenoic acid, and docosahexaenoic acid.

7. The method of claim 1, wherein the lomitapide or pharmaceutically acceptable salt thereof is a lomitapide mesylate.

8. The method of claim 7, wherein the lomitapide mesylate is encapsulated in a capsule.

9. The method of claim 1, wherein the patient has at least 2 mutant alleles at the LDLR, apo B, PCSK9, or LDLRAP1 gene locus.

10. The method of claim 1, wherein the patient has an untreated LDL-C level of greater than 500 mg/dL and cutaneous or tendon xanthoma before 10 years of age or untreated LDL-C level consistent with heterozygous familial hypercholesterolemia in both parents.

11. The method of claim 1, wherein the patient has a treated LDL-C level of at least 300 mg/dL and cutaneous or tendon xanthoma before 10 years of age or untreated LDL-C level consistent with heterozygous familial hypercholesterolemia in both parents.

12. The method of claim 1, wherein the patient has no documented cardiovascular disease and LDL-C level of greater than 160 mg/dL prior to the administration.

13. The method of claim 1, wherein the patient has established cardiovascular disease and LDL-C level of greater than 130 mg/dL prior to the administration.

14. A method of treating homozygous familial hypercholesterolemia (HoFH) in a pediatric patient aged 11 to 15 years in need thereof, comprising administering lomitapide or a pharmaceutically acceptable salt thereof to the patient, wherein said administration comprises:
   (i) administering an initial dose of 2 mg per day of lomitapide, or a pharmaceutically acceptable salt thereof, to the patient for about 4 weeks;
   (ii) titrating the initial dose to a second dose, wherein the second dose is 5 mg per day of lomitapide, or pharmaceutically acceptable salt thereof, and wherein the second dose is administered for about 4 weeks;
   (iii) titrating the second dose to a third dose, wherein the third dose is 10 mg per day of lomitapide, or pharmaceutically acceptable salt thereof, and wherein the third dose is administered for about 4 weeks; and
   (iv) titrating the third dose to a fourth dose, wherein the fourth dose is 20 mg per day of lomitapide, or pharmaceutically acceptable salt thereof, and wherein the fourth dose is administered for about 4 weeks; and
   (v) titrating the fourth dose up to a maximum daily dose of 40 mg per day.

15. The method of claim 14, wherein the patient is on a stable lipid-lowering therapy.

16. The method of claim 14, further comprising administering to the patient vitamin E, alpha-linolenic acid, linoleic acid, eicosapentaenoic acid, and docosahexaenoic acid.

17. The method of claim 14, wherein the lomitapide or pharmaceutically acceptable salt thereof is a lomitapide mesylate.

18. The method of claim 17, wherein the lomitapide mesylate is encapsulated in a capsule.

19. The method of claim 14, wherein the patient has at least 2 mutant alleles at the LDLR, apo B, PCSK9, or LDLRAP1 gene locus.

20. The method of claim 14, wherein the patient has an untreated LDL-C level of greater than 500 mg/dL and cutaneous or tendon xanthoma before 10 years of age or untreated LDL-C level consistent with heterozygous familial hypercholesterolemia in both parents.

21. The method of claim 14, wherein the patient has a treated LDL-C level of at least 300 mg/dL and cutaneous or tendon xanthoma before 10 years of age or untreated LDL-C level consistent with heterozygous familial hypercholesterolemia in both parents.

22. The method of claim 14, wherein the patient has no documented cardiovascular disease and LDL-C level of greater than 160 mg/dL prior to the administration.

23. The method of claim 14, wherein the patient has established cardiovascular disease and LDL-C level of greater than 130 mg/dL prior to the administration.

24. A method of treating hyperlipidemia in a pediatric patient aged 5 to 10 years in need thereof, comprising administering lomitapide or a pharmaceutically acceptable salt thereof to the patient, wherein said administration comprises:

(i) administering an initial dose of 2 mg per day of lomitapide, or a pharmaceutically acceptable salt thereof, to the patient for about 8 weeks;

(ii) titrating the initial dose to a second dose, wherein the second dose is 5 mg per day of lomitapide, or pharmaceutically acceptable salt thereof, and wherein the second dose is administered for about 4 weeks;

(iii) titrating the second dose to a third dose, wherein the third dose is 10 mg per day of lomitapide, or pharmaceutically acceptable salt thereof, and wherein the third dose is administered for about 4 weeks; and (iv) titrating the third dose up to a maximum daily dose of 20 mg per day of lomitapide, or pharmaceutically acceptable salt thereof.

* * * * *